United States Patent
Takeuchi et al.

(10) Patent No.: US 9,740,528 B2
(45) Date of Patent: Aug. 22, 2017

(54) VIRTUAL COMPUTER SYSTEM AND SCHEDULING METHOD

(71) Applicant: Hitachi, Ltd., Tokyo (JP)

(72) Inventors: Shoichi Takeuchi, Tokyo (JP); Shuhei Matsumoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 14/762,027

(22) PCT Filed: Mar. 14, 2013

(86) PCT No.: PCT/JP2013/057141
§ 371 (c)(1),
(2) Date: Jul. 20, 2015

(87) PCT Pub. No.: WO2014/141419
PCT Pub. Date: Sep. 18, 2014

(65) Prior Publication Data
US 2015/0339167 A1   Nov. 26, 2015

(51) Int. Cl.
*G06F 9/455* (2006.01)
*G06F 9/50* (2006.01)

(52) U.S. Cl.
CPC ........ *G06F 9/5016* (2013.01); *G06F 9/45558* (2013.01); *G06F 9/5027* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| 2004/0193803 A1* | 9/2004 | Mogi ................. G06F 12/0871 711/129 |
| 2004/0205298 A1* | 10/2004 | Bearden ............. G06F 12/0862 711/137 |

(Continued)

FOREIGN PATENT DOCUMENTS

| JP | 06-012395 A | 1/1994 |
| JP | 2006-059052 A | 3/2006 |

(Continued)

OTHER PUBLICATIONS

International Search Report of PCT/JP2013/057141.

*Primary Examiner* — Adam Lee
(74) *Attorney, Agent, or Firm* — Mattingly & Malur, PC

(57) ABSTRACT

A scheduling method whereby a virtualization unit, which has multiple nodes containing physical CPUs and physical memories, and which operates a virtual computer by generating logical partitions from the computer resources of the multiple nodes, allocates a physical CPU to the logical CPU. The multiple nodes are coupled via an interconnect, and the virtualization unit selects the physical CPU to be allocated to the logical CPU, and measures performance information related to the performance when the physical memory is accessed from the logical CPU. When the performance information satisfies a prescribed threshold value the physical CPU allocated to the logical CPU is selected from the same node as that of the previously allocated physical CPU, and when the performance information does not satisfy the prescribed threshold value the physical CPU allocated to the logical CPU is selected from a different node than the node of the previously allocated physical CPU.

14 Claims, 35 Drawing Sheets

(56) References Cited

U.S. PATENT DOCUMENTS

| | | | |
|---|---|---|---|
| 2004/0205300 A1* | 10/2004 | Bearden | G06F 12/0862 711/137 |
| 2007/0136721 A1* | 6/2007 | Dunshea | G06F 9/5077 717/174 |
| 2008/0189701 A1 | 8/2008 | Hayakawa et al. | |
| 2009/0182979 A1* | 7/2009 | Farrell | G06F 9/30003 712/200 |
| 2009/0228635 A1* | 9/2009 | Borkenhagen | G06F 12/08 711/103 |
| 2011/0296407 A1* | 12/2011 | Bhandari | G06F 9/455 718/1 |
| 2011/0314225 A1* | 12/2011 | Nishihara | G06F 9/5088 711/119 |
| 2012/0030675 A1 | 2/2012 | Hayakawa et al. | |
| 2012/0226866 A1* | 9/2012 | Bozek | G06F 9/45558 711/122 |
| 2013/0080141 A1* | 3/2013 | Lee | G06F 17/5022 703/21 |
| 2014/0096139 A1* | 4/2014 | Alshinnawi | G06F 11/008 718/103 |
| 2014/0157040 A1* | 6/2014 | Bennah | G06F 11/0793 714/2 |
| 2014/0223122 A1* | 8/2014 | Butt | G06F 9/5088 711/162 |

FOREIGN PATENT DOCUMENTS

| | | |
|---|---|---|
| JP | 2008-186136 A | 8/2008 |
| JP | 2009-205696 A | 9/2009 |

* cited by examiner

100 LPAR MANAGEMENT TABLE

| LPAR NUMBER (101) | LOGICAL CPU COUNT (102) | ALLOCATED PHYSICAL MEMORY START POINT (103) | ALLOCATED PHYSICAL MEMORY SIZE (104) |
|---|---|---|---|
| 1 | 1 | 0 × 1000 | 0 × 1000 |
| 2 | 1 | 0 × 2500 | 0 × 1000 |

*FIG. 2*

200 PHYSICAL CPU MANAGEMENT TABLE

| PHYSICAL CPU NUMBER (201) | PHYSICAL CPU STATE (202) | PHYSICAL CPU NODE NUMBER (203) |
|---|---|---|
| 0 | 3 | 0 |
| 1 | 3 | 0 |
| 2 | 3 | 1 |
| 3 | 3 | 1 |

*FIG. 3*

450 CPU STATE TABLE

| CODE (451) | CPU STATE (452) |
|---|---|
| 1 | RUN |
| 2 | READY |
| 3 | HALT |

300 SPECIFIC LOGICAL CPU MANAGEMENT TABLE

| 301 | 302 | 303 | 304 | 305 | 306 | 307 | 308 | 309 | 310 |
|---|---|---|---|---|---|---|---|---|---|
| ENTRY NUMBER | LPAR NUMBER | LOGICAL CPU NUMBER | LOGICAL CPU STATE | PREVIOUS NODE NUMBER | TOTAL CACHE READ COUNT | TOTAL CACHE HIT COUNT | TOTAL RUNNING TIME | NODE #0 PHYSICAL CPU RUNNING TIME | NODE #1 PHYSICAL CPU RUNNING TIME |

*FIG. 5*

400 SHARED LOGICAL CPU MANAGEMENT TABLE

| 401 | 402 | 403 | 404 | 405 | 406 | 407 | 408 | 409 | 410 |
|---|---|---|---|---|---|---|---|---|---|
| ENTRY NUMBER | LPAR NUMBER | LOGICAL CPU NUMBER | LOGICAL CPU STATE | PREVIOUS NODE NUMBER | TOTAL CACHE READ COUNT | TOTAL CACHE HIT COUNT | TOTAL RUNNING TIME | NODE #0 PHYSICAL CPU RUNNING TIME | NODE #1 PHYSICAL CPU RUNNING TIME |

500 TEMPORARILY STORED LOGICAL CPU MANAGEMENT TABLE ENTRY

| 501 | 502 | 503 | 504 | 505 | 506 | 507 | 508 | 509 |
|---|---|---|---|---|---|---|---|---|
| LPAR NUMBER | LOGICAL CPU NUMBER | LOGICAL CPU STATE | PREVIOUS NODE NUMBER | TOTAL CACHE READ COUNT | TOTAL CACHE HIT COUNT | TOTAL RUNNING TIME | NODE #0 PHYSICAL CPU RUNNING TIME | NODE #1 PHYSICAL CPU RUNNING TIME |

FIG. 8

600 TEMPORARY CALCULATION TABLE

| 601 | 602 | 603 | 604 | 605 |
|---|---|---|---|---|
| TOTAL CACHE HIT RATIO | CACHE READ COUNT | CACHE HIT COUNT | RUNNING START TIME | RUNNING END TIME |
| 0 | 0 | 0 | 0 | 0 |

700 THRESHOLD MANAGEMENT TABLE

| 701 | 702 | 703 | 704 | 705 | 706 | 707 | 708 |
|---|---|---|---|---|---|---|---|
| LPAR NUMBER | LOGICAL CPU NUMBER | THRESHOLD α | THRESHOLD β | MONITORING ENABLING FLAG | WRITE COMPLETION FLAG | TOTAL CACHE HIT RATIO | TOTAL RUNNING TIME |
| 1 | 0 | 0.5 | 2000 | 0 | 0 | 0 | 0 |
| 2 | 0 | 0.5 | 2000 | 0 | 0 | 0 | 0 |

FIG. 9

PHYSICAL CPU MANAGEMENT TABLE (200)

| PHYSICAL CPU NUMBER | PHYSICAL CPU STATE | PHYSICAL CPU NODE NUMBER |
|---|---|---|
| 0 | 3→2→1 | 0 |
| 1 | 3 | 0 |
| 2 | 3 | 1 |
| 3 | 3 | 1 |

*FIG. 13*

| ENTRY NUMBER | LPAR NUMBER | LOGICAL CPU NUMBER | LOGICAL CPU STATE | PREVIOUS NODE NUMBER | TOTAL CACHE READ COUNT | TOTAL CACHE HIT COUNT | TOTAL RUNNING TIME | NODE #0 PHYSICAL CPU RUNNING TIME | NODE #1 PHYSICAL CPU RUNNING TIME |
|---|---|---|---|---|---|---|---|---|---|
| 1 | 1 | 0 | 2 | -1 | 0 | 0 | 0 | 0 | 0 |

400 SHARED LOGICAL CPU MANAGEMENT TABLE
401 402 403 404 405 406 407 408 409 410

FIG. 14

600 TEMPORARY CALCULATION TABLE

| 601 | 602 | 603 | 604 | 605 |
|---|---|---|---|---|
| TOTAL CACHE HIT RATIO | CACHE READ COUNT | CACHE HIT COUNT | RUNNING START TIME | RUNNING END TIME |
| 0 | 0 | 0 | 0 → 200 | 0 |

460 FACTOR CODE TABLE

| FACTOR CODE 461 | FACTOR 462 | LOGICAL CPU STATE 463 |
|---|---|---|
| 0×000 ~ 0×00F | TIMER AND I/O INTERRUPT | READY |
| 0×010 ~ 0×01F | HYPERVISOR CALL | RUN |
| 0×020 ~ 0×02F | PROGRAM EXCEPTION | RUN |
| 0×030 | HALT COMMAND | HALT |

*FIG. 19*

500 TEMPORARILY STORED LOGICAL CPU MANAGEMENT TABLE ENTRY

| 501 LPAR NUMBER | 502 LOGICAL CPU NUMBER | 503 LOGICAL CPU STATE | 504 PREVIOUS NODE NUMBER | 505 TOTAL CACHE READ COUNT | 506 TOTAL CACHE HIT COUNT | 507 TOTAL RUNNING TIME | 508 NODE #0 PHYSICAL CPU RUNNING TIME | 509 NODE #1 PHYSICAL CPU RUNNING TIME |
|---|---|---|---|---|---|---|---|---|
| 1 | 0 | 1→2 | 0 | 0→1000 | 0→300 | 0→800 | 0→800 | 0 |

*FIG. 21A*

600 TEMPORARY CALCULATION TABLE

| 601 TOTAL CACHE HIT RATIO | 602 CACHE READ COUNT | 603 CACHE HIT COUNT | 604 RUNNING START TIME | 605 RUNNING END TIME |
|---|---|---|---|---|
| 0→0.3 | 0→1000 | 0→300 | 200 | 0→1000 |

700 THRESHOLD MANAGEMENT TABLE

| LPAR NUMBER 701 | LOGICAL CPU NUMBER 702 | THRESHOLD α 703 | THRESHOLD β 704 | MONITORING ENABLING FLAG 705 | WRITE COMPLETION FLAG 706 | TOTAL CACHE HIT RATIO 707 | TOTAL RUNNING TIME 708 |
|---|---|---|---|---|---|---|---|
| 1 | 0 | 0.5 | 2000 | 0→1 | 0 | 0 | 0 |
| 2 | 0 | 0.5 | 2000 | 0 | 0 | 0 | 0 |

FIG. 25B

700 THRESHOLD MANAGEMENT TABLE

| LPAR NUMBER 701 | LOGICAL CPU NUMBER 702 | THRESHOLD α 703 | THRESHOLD β 704 | MONITORING ENABLING FLAG 705 | WRITE COMPLETION FLAG 706 | TOTAL CACHE HIT RATIO 707 | TOTAL RUNNING TIME 708 |
|---|---|---|---|---|---|---|---|
| 1 | 0 | 0.5 | 2000 | 1→0 | 0→1 | 0→0.4 | 0→500 |
| 2 | 0 | 0.5 | 2000 | 0 | 0 | 0 | 0 |

| 701 LPAR NUMBER | 702 LOGICAL CPU NUMBER | 703 THRESHOLD α | 704 THRESHOLD β | 705 MONITORING ENABLING FLAG | 706 WRITE COMPLETION FLAG | 707 TOTAL CACHE HIT RATIO | 708 TOTAL RUNNING TIME |
|---|---|---|---|---|---|---|---|
| 1 | 0 | 0.5 | 2000 | 0 | 1→0 | 0.4 | 500 |
| 2 | 0 | 0.5 | 2000 | 0 | 0 | 0 | 0 |

700 THRESHOLD MANAGEMENT TABLE

FIG. 25C

VIRTUAL COMPUTER SYSTEM AND SCHEDULING METHOD

BACKGROUND

This invention relates to scheduling in cases where physical resources on a physical computer are logically partitioned to generate a plurality of logical partitions (hereinafter referred to as LPARs) and to allow for the sharing of a plurality of physical CPUs among a plurality of logical CPUs by time division.

In recent years, the improved performance per physical computer has made popular a method involving building a plurality of logical computers on a physical computer, in order to cut management cost and power consumption by increasing the rate of computer integration. Logical computers can be built by, for example, a method in which a hypervisor generates and controls at least one logical computer by allocating divided or shared computer resources such as a physical CPU, a physical memory, and an input/output apparatus to logical partitions (LPARs), which are logical computers.

In order to share one physical CPU among a plurality of LPARs, a hypervisor needs to execute time division in which the physical CPU is divided into unit times called time slices, and to manage the running times of logical CPUs allocated to the respective LPARs during sharing. This control is generally called scheduling.

A non-uniform memory access (NUMA) configuration, on the other hand, is a computer configuration in which a plurality of CPUs and a memory on a physical computer are grouped into one group called a node, and an access cost that is required of a physical CPU to access a memory in the same node as the physical CPU is smaller than an access cost that is required of the physical CPU to access a memory in another node. The memory in the same node is called a local memory and the memory in another node is called a remote memory.

When many physical CPUs are installed, the NUMA configuration, where nodes can separately access physical memories in parallel, is reduced in conflicts among physical CPUs with regards to physical memory access, whereas a uniform memory access (UMA) configuration, where the same memory access cost is required of every physical CPU to access a physical memory, has a high chance of conflict. Because of this advantage, the NUMA configuration is employed by not a small number of computers in recent years, where the number of CPUs installed has increased.

One of mechanisms for reducing the cost of accessing a physical memory is a physical memory cache (hereinafter referred to as cache) that is located physically close to physical CPUs to save the contents of the memory temporarily. Each time the physical memory is accessed, the accessed contents of the memory are saved in the cache so that, the next time, the same contents of the memory can be accessed by accessing the cache. The cost of accessing the physical memory is reduced as a result. Generally speaking, access to a cache is quicker than access to a local memory.

In JP 2008-186136 A, there is disclosed a technology of a virtual computer installation method in which, when a system is busy throughout, high-priority processing is distributed among physical CPUs to be executed while the processing performance of LPARs is kept from dropping.

SUMMARY

In JP 2008-186136 A, however, the high-priority processing is executed repeatedly on a physical CPU that is idle. The same can be said when the high-priority processing is read as processing of LPARs.

A problem of allowing one physical CPU to keep executing processing of LPARs in a computer that has the NUMA configuration is that, when the processing of LPARs is accompanied by memory access that exceeds the cache capacity and the accessed memory is a remote memory from the physical CPU executing the processing, the physical CPU keeps accessing the remote memory unless the entire computer system becomes busy and continues the processing with the cost of accessing the physical memory remaining high.

This invention has been made in view of the problem described above, and an object of this invention is therefore to prevent a state in which the cost of accessing a physical memory is high from lasting.

A representative aspect of the present disclosure is as follows. A virtual computer system, comprising: a plurality of nodes each comprising physical CPUs comprising a cache memory, and a physical memory; and a virtualization module for allocating computer resources of the plurality of nodes to virtual computers, wherein the plurality of nodes are coupled to one another via an interconnect, wherein the virtualization module comprises: a logical partition management module for generating logical partitions and logical CPUs as the computer resources to be allocated to the virtual computers; a scheduling module for selecting, for each of the logical CPUs, one of the physical CPUs that is to run the each of the logical CPUs; and a monitoring module for measuring, for each of the logical CPUs, performance information on access performance in access from the each of the logical CPUs to the physical memories, wherein in a case where the performance information reaches a given threshold, the scheduling module selects the physical CPU that is to run the logical CPU from the same node as one of the plurality of nodes to which a physical CPU that has run the logical CPU last time belongs, and, in a case where the performance information falls short of the given threshold, selects the physical CPU that is to run the logical CPU from another of the plurality of nodes different from the one of the plurality of nodes to which the physical CPU that has run the logical CPU last time belongs.

According to the one embodiment of this invention, in a physical computer that varies in memory access performance depending on the positional relation between a physical CPU and a physical memory in access to a plurality of physical memories by a plurality of physical CPUs, such as a computer that has the NUMA configuration, at least intermediate memory access performance between the highest performance and the lowest performance can be obtained when the number of physical CPUs is enough in relation to the number of logical CPUs and the physical memory access performance of logical CPUs is observed for a given observation time, which is 1 second or so. An additional effect in that the cache memory makes the memory read/write performance high is obtained when the cache hit ratio is high.

BRIEF DESCRIPTION OF THE DRAWINGS

FIG. 2 is a diagram for showing an example of the LPAR management table which holds settings of LPARs in the first embodiment of this invention.

FIG. 3 is a diagram for showing an example of the physical CPU management table which holds settings of LPARs in the first embodiment of this invention.

FIG. 5 is a diagram for showing an initial state of the specific logical CPU management table in the first embodiment of this invention.

FIG. 6 is a diagram for showing an initial state of the shared logical CPU management table in the first embodiment of this invention.

FIG. 7 is a diagram for showing an initial state of the temporarily stored logical CPU management table in the first embodiment of this invention.

FIG. 8 is a diagram for showing an initial state of the temporary calculation table in the first embodiment of this invention.

FIG. 9 is a diagram for showing an example of the threshold management table, which holds a determination threshold for selecting a physical CPU that runs the logical in the first embodiment of this invention.

FIG. 13 is a diagram for showing an example of how the physical CPU management table looks after the processing of activating the LPAR in the first embodiment of this invention.

FIG. 14 is a diagram for showing an example of how the shared logical CPU management table looks after the processing of activating the LPAR in the first embodiment of this invention.

FIG. 19 is a diagram for showing an example of the factor code table, which holds guest mode ending factor codes in the first embodiment of this invention.

FIG. 21A is a diagram for showing how the temporarily stored logical CPU management table entry looks after the processing of FIG. 20A in the first embodiment of this invention.

FIG. 21B is a diagram for showing how the temporary calculation table looks after the processing of FIG. 20A in the first embodiment of this invention.

FIG. 25A is a diagram for showing how the threshold management table looks after the monitoring enabling processing of FIG. 23 is executed in the first embodiment of this invention.

FIG. 25B is a diagram for showing how the threshold management table looks after the physical CPU dispatch ending processing of FIG. 20A to FIG. 20C is executed in the first embodiment of this invention.

FIG. 25C is a diagram for showing how the threshold management table looks after the monitoring processing of FIG. 24 is executed in the first embodiment of this invention.

DETAILED DESCRIPTION OF THE PREFERRED EMBODIMENTS

Embodiments of this invention are described below with reference to the accompanying drawings.

First Embodiment

Figure 1A:
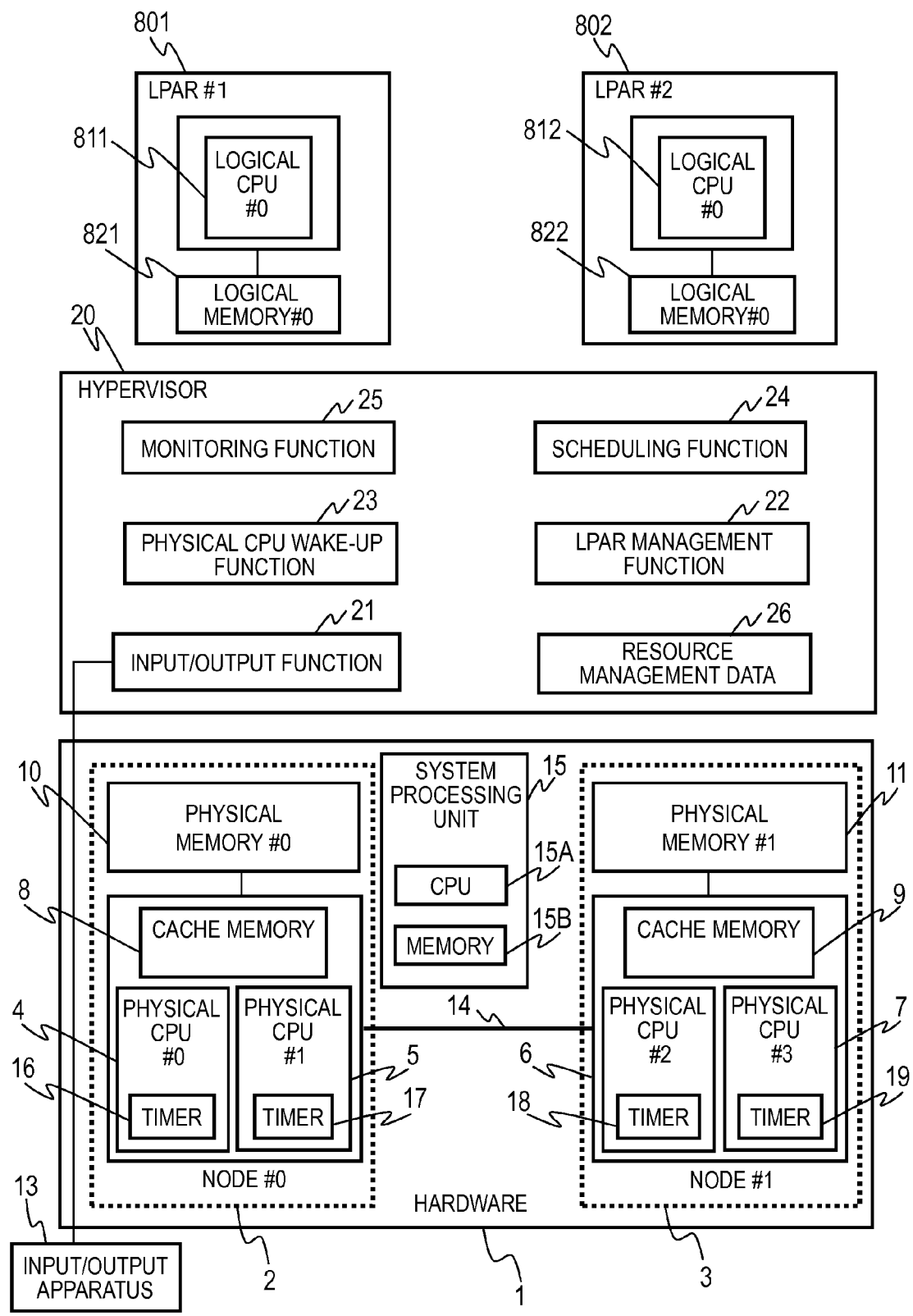
FIG. 1A is a block diagram for illustrating a basic configuration example of a virtual computer system in a first embodiment of this invention.
Figure 1B:
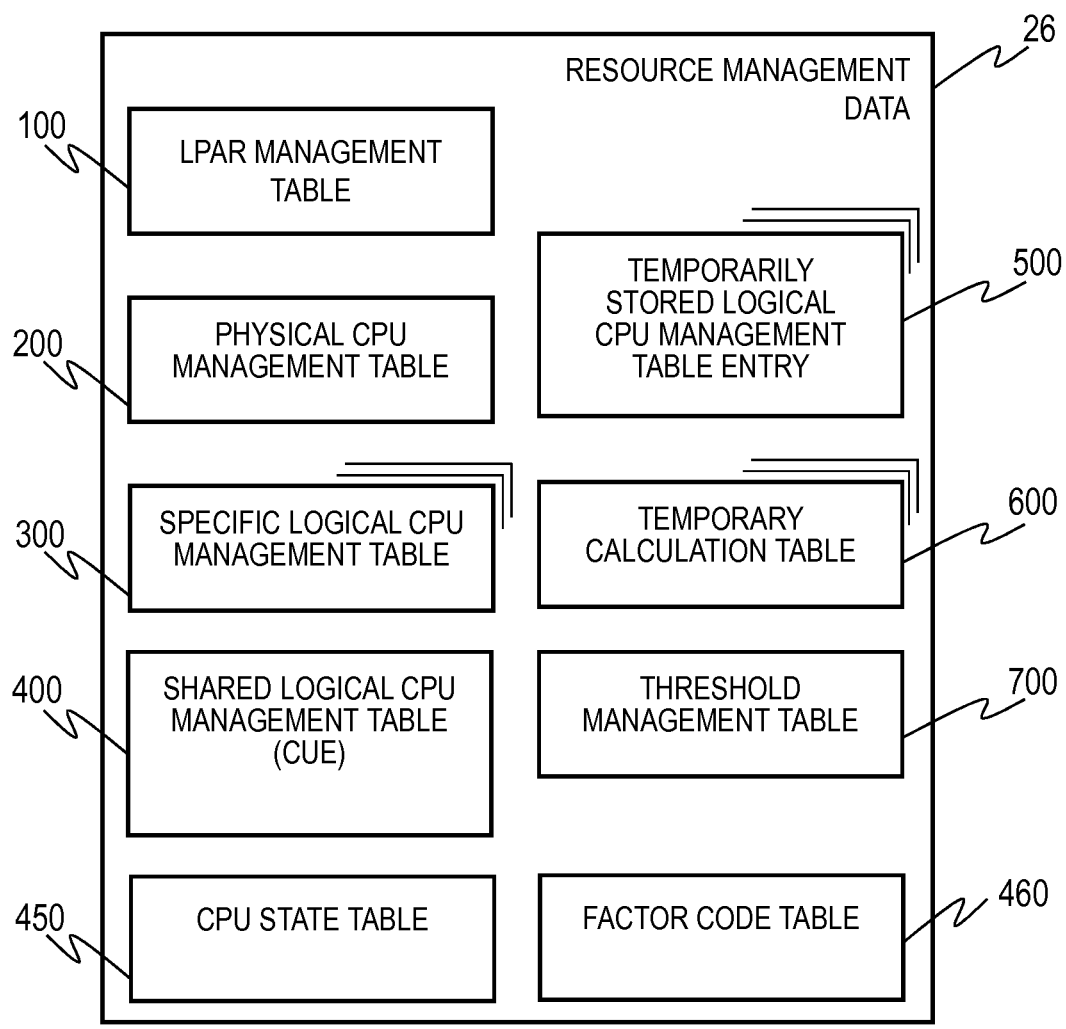
FIG. 1B is a block diagram for illustrating a resource management data configuration example of a virtual computer system in the first embodiment of this invention.

FIG. 1A and FIG. 1B are block diagrams for illustrating a basic configuration example of a virtual computer system in this invention.

A physical computer that provides at least one virtual computer includes physical CPUs (#0 to #3) 4 to 7, timers 16 to 19, which are each provided for one of the physical CPUs (or physical processors), physical cache memories 8 and 9 each of which belongs to one of nodes, and physical memories 10 and 11, which are each coupled to one of the nodes, an input/output apparatus 13, and a system processing unit 15.

The physical CPUs 4 and 5, the timers 16 and 17, the physical cache memory 8, and the physical memory 10 belong to a node (#0) 2. The physical CPUs 6 and 7, the timers 18 and 19, the physical cache memory 9, and the physical memory 11 belong to a node (#1) 3. The nodes are coupled to each other by an interconnect 14.

A hypervisor (virtualization module) 20, which is loaded onto a part of a memory space of the computer, generates and controls at least one logical computer (or virtual computer) by allocating the physical CPUs 4 to 7, the physical memories 10 and 11, the input/output apparatus 13, and other physical computer resources to logical partitions (LPARs) 801 and 802, which are logical computers, through division or sharing.

The system processing unit 15 includes a physical CPU 15A and a physical memory 15B, which are not allocated to the LPARs 801 and 802 and which execute only processing of the hypervisor 20.

The hypervisor 20 includes an input/output function 21, which receives an input from a user and outputs information to the user via the input/output apparatus 13, an LPAR management function 22, which sets computer resources to be allocated to the LPARs 801 and 802 and which generates and activates the LPARs 801 and 802, a physical CPU wake-up function 23, which wakes up the physical CPUs 4 to 7 in a sleep state (or shutdown state), a scheduling function 24, which enables a plurality of logical CPUs (logical processors) to share one physical CPU by time division (time slicing), a monitoring function 25, which measures the cache hit ratio for each of logical CPUs 811 and 812, or measures the cache read count and the cache hit count for each of the physical CPUs 4 to 7, and resource management data 26, where resource information of the physical computer (hardware) 1 is held.

The functions of the hypervisor 20 are processed by the system processing unit 15 as described above. In the example of FIG. 1A and FIG. 1B, the hypervisor 20 generates the logical CPUs 811 and 812 and logical memories 821 and 822 from the physical computer hardware 1, and allocates the resources to the generated LPARs 801 and 802.

The resource management data 26 includes, as illustrated in FIG. 1B, an LPAR management table 100, which is used to manage the logical CPUs 811 and 812 allocated to the LPARs 801 and 802 and the capacities of the logical memories 821 and 822, a physical CPU management table 200, which is used to manage the state of the physical CPUs 4 to 7, specific logical CPU management tables 300 each of which holds, for one of the physical CPUs 4 to 7, information on a logical CPU that can be run only by, or allocated only to, the physical CPU, a shared logical CPU management table 400, which holds information on logical CPUs that are run by a physical CPU selected from all of the physical CPUs 4 to 7, temporarily stored logical CPU management table entries 500, which are each held for one of the physical CPUs 4 to 7, temporary calculation tables 600, which are used to compute the hit ratios of the cache memories 8 and 9, a threshold management table 700, which holds a reference value for determining which of the physical CPUs 4 to 7 is to run the logical CPUs 811 and 812 in the next time slice period, a CPU state table 450, which defines the running state of the physical CPUs 4 to 7, and a factor code table 460, which holds factors for ending a guest mode on the virtual computers of the LPARs 801 and 802.

The maximum number of LPARs on the hypervisor 20 and the maximum number of logical CPUs that constitutes the LPARs are determined by a maximum number defined in the hypervisor 20. In the example illustrated in the configuration diagram of FIG. 1A, the hypervisor generates two LPARs, 801 and 802, the logical CPUs 811 and 812 and the logical memories 821 and 822 are set from the hardware 1, and one logical CPU and one logical memory are allocated to each of the LPARs 801 and 802.

The monitoring function 25 of the hypervisor 20 has a counter for measuring, for each of the logical CPUs 811 and 812 (or the physical CPUs 4 to 7), the read count of the relevant one of the cache memories 8 and 9 (hereinafter referred to as cache read count) and the hit count of the cache memory (hereinafter referred to as cache hit count), and computes the cache hit ratio for each of the logical CPUs 811 and 812 (or the physical CPUs 4 to 7).

This invention is outlined as follows:

In this invention, when the logical CPU 811 (812) is run continuously by physical CPUs of the same node out of the physical CPUs 4 to 7, the hypervisor 20 determines whether or not the continuous running time of the logical CPU 811 (812) has exceeded a given period of time by which a given cache hit ratio is expected to be reached. In the case where the given period of time has been exceeded, the hypervisor 20 determines whether or not the cache hit ratio of the logical CPU 811 (812) is higher than a threshold. When the cache hit ratio is lower than the threshold, the hypervisor 20 determines that the logical CPU 811 is not benefiting from the cache memory 8 or 9 and, if a physical CPU in a sleep state is found in a node that is not the one where the logical CPU 811 (812) has been run continuously, wakes up this physical CPU so that the logical CPU 811 (812) is run by this physical CPU.

When the cache hit ratio is higher than the threshold, on the other hand, the hypervisor 20 does not wake up a sleep-state physical CPU in a node that is not the one where the logical CPU 811 (812) has been run continuously, and allows the physical CPU 4 (or 5) of the current node to keep running the logical CPU 811. In the case where the cache hit ratio is lower than the threshold but a physical CPU in a sleep state is not found in a node that is not the one where the logical CPU 811 has been run continuously, the logical CPU 811 is run by the currently awake physical CPU 6 (or 7).

The logical CPU 811 (812) to be run by the physical CPU 4 (5 to 7) is held in a logical CPU queue (the shared logical CPU management table 400) provided in the hypervisor 20. The hypervisor 20 controls the physical CPU 4 (5 to 7) so that the logical CPU 811 (812) is run in an order in which the logical CPU 811 (812) has been put in the queue. After the running of the logical CPU 811 (812) is finished with the elapse of a given time slice period, the hypervisor 20 puts the logical CPU 811 back in the logical CPU queue.

The user can set a threshold $\beta$ for a total logical CPU running time at which the given cache hit ratio is expected to be reached and a threshold $\alpha$ for a cache hit ratio for determining that a logical CPU is benefiting from the cache memory 8 or 9. The former is referred to as total running time threshold $\beta$ and the latter is referred to as cache hit ratio threshold $\alpha$.

The total running time threshold $\beta$ is smaller than a time period T (described later) in which an average value of the memory access performance (latency, transfer rate, or the like) of the physical memory 10 or 11 is measured. The reason therefor is as follows:

In this invention, the length of time in which the logical CPU 811 (812) is run continuously by the physical CPU 4 (or 5) of the same node is the total running time threshold $\beta$, and, if the total running time threshold $\beta$ is larger than the time period T in which an average value of the memory access performance is measured, the physical CPU 4 (or 5) of one node keeps running the logical CPU 811 for the duration of the time period T. This leaves a chance that the average memory access performance of the logical CPU 811 in the time period T would be the access performance of access to a remote memory, namely, low access performance (long latency) as described in the "BACKGROUND" section. The total running time threshold $\beta$ is therefore set to a value smaller than the time period T in which an average value of the memory access performance is measured.

The hypervisor 20 and the function modules of the hypervisor 20, such as the scheduling function 24, are loaded as programs onto the memory 15B of the system processing unit 15, and are executed by the physical CPU 15A of the system processing unit 15.

The physical CPU 15A of the system processing unit 15 operates as function modules that implement given functions by operating as programmed by the programs of the respective function modules. For example, the physical CPU 15A functions as the scheduling function 24 by operating as programmed by a scheduling program. The same applies to other programs. The physical CPU 15A of the system processing unit 15 also functions as function modules that implement a plurality of processing procedures executed by the respective programs. The computer and the virtual computer system are an apparatus and a system that include these function modules.

Information such as programs and tables for implementing the functions of the hypervisor 20 can be stored in a storage sub-system (not shown), a non-volatile semiconductor memory, a storage device such as a hard disk drive or a solid state drive (SSD), or a computer-readable, non-transitory data storage medium such as an IC card, an SD card, or a DVD.

FIG. 2 is a diagram for showing an example of the LPAR management table 100, which holds settings of LPARs. The LPAR management table 100 of FIG. 2 includes in each entry an LPAR number 101, which indicates the identifier of the LPAR 801 or 802, a logical CPU count 102, which indicates the number of logical CPUs to be allocated to the LPAR 801 or 802 out of the logical CPUs 811 and 812, an allocated physical memory start point 103, which indicates the start point (address) of a part of the physical memory 10 or 11 to be allocated to the LPAR 801 or 802 as the logical memory 821 or 822, and an allocated physical memory size 104, which indicates the size of the part of the physical memory 10 or 11 to be allocated to the logical memory 821 or 822, which is counted from the start point.

The LPAR management table 100 has as many entries as the number of LPARs defined in advance, here, two entries in total for the LPARs 801 and 802. The input/output function 21 of the hypervisor 20 receives an LPAR environment setting command from the user via the input/output apparatus 13, and the LPAR management function 22 reads the LPAR number, the logical CPU count, and information on a memory area to define each entry in the LPAR management table 100.

FIG. 3 is a diagram for showing an initial state of the physical CPU management table 200, which holds information on the physical CPUs 4 to 7 for running the logical CPUs 811 and 812.

The physical CPU management table 200 of FIG. 3 includes in each entry a physical CPU number 201, which indicates the identifier of one of the physical CPUs 4 to 7, a state 202, which indicates the running state of one of the physical CPUs 4 to 7 that is identified by the physical CPU number 201, and a physical CPU node number 203, which indicates the node number of a node to which one of the physical CPUs 4 to 7 that is identified by the physical CPU number 201 belongs. The physical CPU management table 200 of FIG. 3, which holds physical CPUs that can be shared between the LPARs 801 and 802 by time division, has as many entries as the number of physical CPUs that run the logical CPUs 811 and 812 of the LPARs 801 and 802.

Figures 4A, 4B:
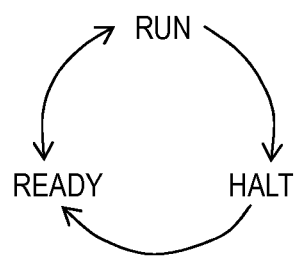
FIG. 4A is a diagram for showing an example of the CPU state table in the first embodiment of this invention.
FIG. 4B is a state transition diagram in the first embodiment of this invention.

FIG. 4A is a table that associates a code with a state of the physical CPUs 4 to 7 and the logical CPUs 811 and 812 as defined in advance in the hypervisor 20, and FIG. 4B is a state transition diagram. FIG. 4A is a diagram for showing an example of the CPU state table 450, which holds the association relation between a state of the physical CPUs 4 to 7 (the logical CPUs 811 and 812) and a code. FIG. 4B is a diagram of transitions in the state of the physical CPUs 4 to 7 (the logical CPUs 811 and 812).

The initial state of a CPU, irrespective of whether the CPU is a physical component or a logical component, is "halt" ("3" as a code 451 in FIG. 4A), which indicates a state where no processing is being executed. When processing is generated, the CPU state shifts from "halt" to "ready" ("2" as the code 451 in FIG. 4A), which indicates a state where processing can be executed any time. After the processing is started, the CPU state shifts from "ready" to "run" ("1" as the code 451 in FIG. 4A), which indicates a state where processing is being executed. When the processing is finished, the CPU state shifts from "run" to "halt" in the case where there is nothing to process, and shifts from "run" to "ready" in the case where a wait for I/O is generated or other similar cases. The CPU state does not shift directly to "run" from "halt", and does not shift to "halt" from "ready".

The hypervisor 20 recognizes the physical CPUs 4 to 7 and their node numbers when activated, and only physical CPUs that are defined in the hypervisor 20 in advance out of the physical CPUs 4 to 7 are added to the physical CPU management table 200. The CPU state at that point is "halt" for all of the added physical CPUs. A sleeping state may be added as a "halt" state.

FIG. 5 is a diagram for showing an initial state (zero entries) of the specific logical CPU management tables 300, which are each set for one of the physical CPUs 4 to 7 to hold information of the logical CPU 811 or 812.

The specific logical CPU management table 300 of FIG. 5 includes in each single entry an entry number 301, which indicates a place in entry order of the entry, an LPAR number 302 of an LPAR of the entry, a logical CPU number 303 of a logical CPU of the entry, a logical CPU state 304 of the logical CPU of the entry, a previous node number 305, which indicates the node number of a node to which a physical CPU that has run the logical CPU of the entry last time belongs, a total cache read count 306, a total cache hit count 307, and a total running time 308, which have been counted during the running in the previous node, a node #0 physical CPU running time 309, which indicates the total running time on a physical CPU whose node number is "#0" since the activation of the LPAR of the entry (the LPAR 801 or 802), and a node #1 physical CPU running time 310, which similarly indicates the total running time on a physical CPU whose node number is "#1" since the activation of the LPAR of the entry.

Each specific logical CPU management table 300 is set for one of the physical CPUs 4 to 7 by the hypervisor 20, and holds an entry created by the scheduling function 24 for the logical CPU 811 or 812 to be allocated preferentially to the relevant one of the physical CPUs 4 to 7. The specific logical CPU management table 300 corresponds to the method of running the logical CPU 811 by the physical CPU 4 or 5 of another node, which has been described in the outline of this invention.

FIG. 6 is a diagram for showing an initial state (zero entries) of the shared logical CPU management table 400, which holds information of the logical CPUs 811 and 812 to be run by a physical CPU selected from all of the physical CPUs 4 to 7.

The shared logical CPU management table 400 of FIG. 6 has the same entry configuration as the one in the specific logical CPU management table 300 of FIG. 5. Specifically, each single entry in the shared logical CPU management table 400 includes an entry number 401, an LPAR number 402, a logical CPU number 403, a logical CPU state 404, a previous node number 405, a total cache read count 406, a total cache hit count 407, a total running time 408, a node #0 physical CPU running time 409, and a node #1 physical CPU running time 410.

There is only one shared logical CPU management table 400 in the hypervisor 20, and the shared logical CPU management table 400 holds an entry created by the scheduling function 24 for a logical CPU that can be run by any one of the physical CPUs.

FIG. 7 is a diagram for showing an initial state (zero entries) of the temporarily stored logical CPU management table entries 500, which temporarily hold information of the logical CPUs 811 and 812 when the logical CPUs 811 and 812 are run by the physical CPUs 4 to 7. The temporarily stored logical CPU management table entry 500 of FIG. 7 has the same entry configuration as the one in the specific logical CPU management table 300 of FIG. 5, except that the entry number is removed. Specifically, each single entry that is the temporarily stored logical CPU management table entry 500 includes an LPAR number 501, a logical CPU number 502, a logical CPU state 503, a previous node number 504, a total cache read count 505, a total cache hit count 506, a total running time 507, a node #0 physical CPU running time 508, and a node #1 physical CPU running time 509. The temporarily stored logical CPU management table entries 500 differ from the specific logical CPU management tables 300 and the shared logical CPU management table 400 in that the entry number is not included.

Each temporarily stored logical CPU management table entry 500 is set for one of the physical CPUs 4 to 7. The temporarily stored logical CPU management table entry 500 of one of the physical CPUs 4 to 7, which are controlled by the scheduling function 24, is an entry created by the scheduling function 24 for one of the logical CPUs 811 and 812 that is being run by the physical CPU.

FIG. 5 has two node physical CPU running time columns, the node #0 physical CPU running time 309 and the node #1 physical CPU running time 310, FIG. 6 has two node physical CPU running time columns, the node #0 physical CPU running time 409 and the node #1 physical CPU running time 410, and FIG. 7 has two node physical CPU running time columns, the node #0 physical CPU running time 508 and the node #1 physical CPU running time 509, because the configuration of FIG. 1 has two nodes (#0 and #1). The number of the columns increases with an increase in the number of nodes.

The maximum total entry count of each specific logical CPU management table 300 and the maximum total entry count of the shared logical CPU management table 400 are equal to the number of logical CPUs that are allocated to the activated LPARs 801 and 802, here, the logical CPUs 811 and 812.

The temporarily stored logical CPU management table entry 500 of one of the physical CPUs 4 to 7 holds information on one of the logical CPUs 811 and 812 that is being run by the physical CPU, and the maximum entry count thereof is accordingly 1. The specific logical CPU management tables 300, the shared logical CPU management table 400, and the temporary storage logical CPU management table entries 500 are initially empty tables without entries as shown in FIG. 5, FIG. 6, and FIG. 7 because not one logical CPU is being run at that point.

FIG. 8 is a diagram for showing an initial state of the temporary calculation tables, which temporarily store calculation information for selecting a physical CPU that is to run the logical CPU 811 or 812 out of the physical CPUs 4 to 7. The temporary calculation table 600 of FIG. 8 has areas for saving a total cache hit ratio 601, a cache read count 602 and a cache hit count 603, which have been counted when a logical CPU in question has been run on a physical CPU, and a running start time 604 and a running end time 605, at which the running of the logical CPU by the physical CPU has started and ended.

FIG. 9 is a diagram for showing an example of the threshold management table 700, which holds a determination threshold for selecting a physical CPU that runs the logical CPU 811 or 812 out of the physical CPUs 4 to 7. The threshold management table 700 of FIG. 9 includes in each single entry an LPAR number 701, a logical CPU number 702, a threshold α 703, which indicates a total cache hit ratio threshold necessary to select a physical CPU that is to run a logical CPU of the entry next, a threshold β 704, which indicates a total running time threshold, a monitoring enabling flag 705, which indicates whether or not the current running situation is to be monitored, a write completion flag 706, which indicates whether or not results of the monitoring have been written, and a total cache hit ratio 707 and a total running time 708, which are written results of the monitoring.

Entries in the threshold management table 700 of FIG. 9 are defined after the LPAR management function 22 defines entries of the LPAR management table 100. Shown in the threshold management table 700 of FIG. 9 is a state that immediately follows the creation of entries when an LPAR #1 (801) and an LPAR #2 (802) are defined and the threshold α and the threshold β are defined in advance in the hypervisor 20 as "0.5" and "2000", respectively. In an initial state where the LPARs 801 and 802 are not defined, the threshold management table 700 has no entries. In other words, the threshold management table 700 is an empty table.

As described above, the threshold β is smaller than the time period T (for example, 1 second) during which an average value of the memory access performance is measured.

Figure 10:
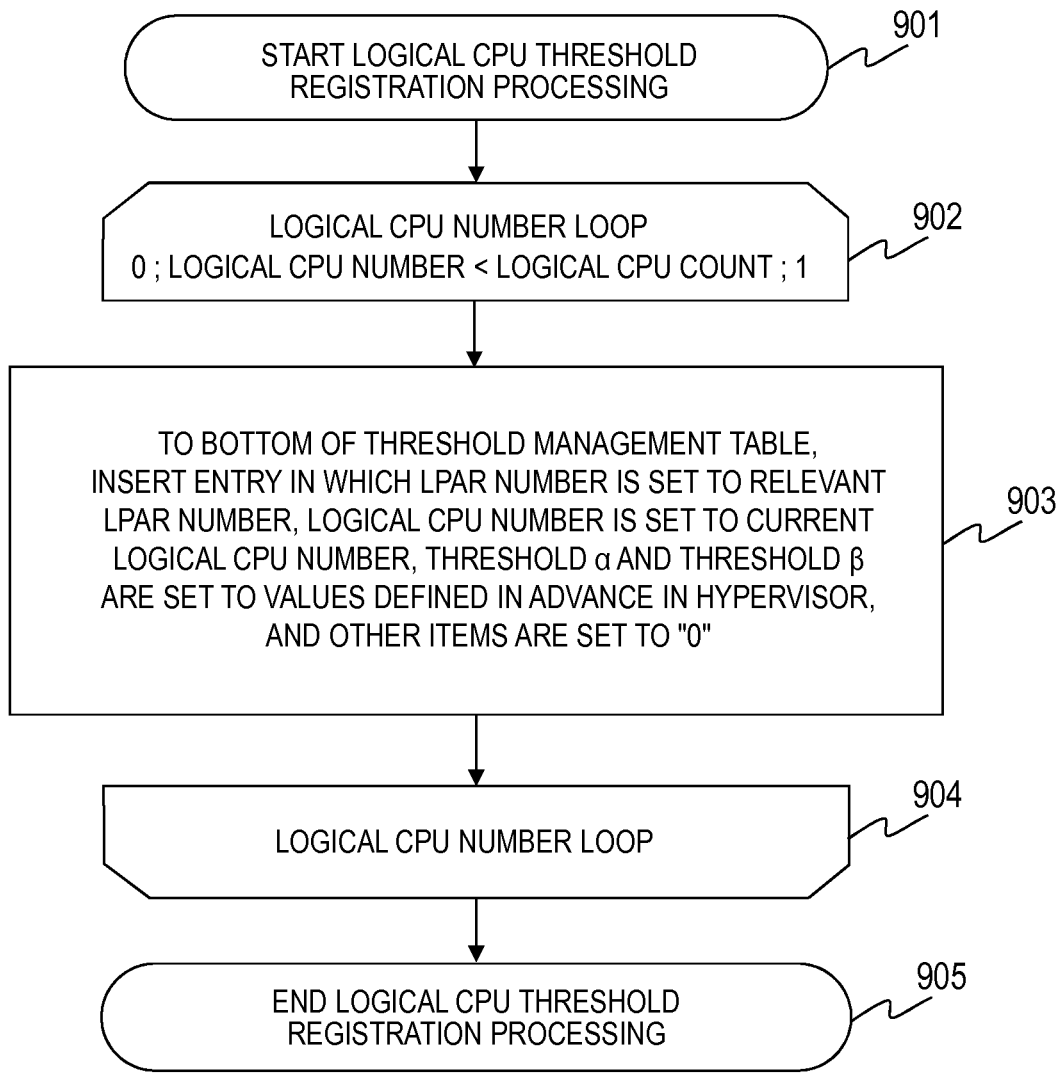
FIG. 10 is a flow chart for illustrating an example of threshold registration processing, which is executed in the hypervisor in the first embodiment of this invention.

FIG. 10 is a flow chart for illustrating an example of threshold registration processing, which is executed in the hypervisor 20. The processing of FIG. 10 is executed subsequently after the input/output function 21 of the hypervisor 20 receives an LPAR environment setting command via the input/output apparatus 13 and the LPAR management function 22 adds entries to the LPAR management table 100, and is processing in which the LPAR management function 22 registers thresholds of the logical CPUs 811 and 812 of the LPARs 801 and 802 in the threshold management table 700. A description of this processing is given below in which an LPAR of an entry that is added to the LPAR management table 100 immediately before this processing is executed is the LPAR 801.

The LPAR management function 22 repeats a loop (902 to 904) in which the logical CPU number is set to 0, Step 903 is executed depending on the logical CPU count of the LPAR 801 (here, the LPAR 801 has the logical CPU 811), and "1" is added to the logical CPU number.

In Step 903, the LPAR management function 22 inserts, as the last entry of the threshold management table 700, an entry in which the LPAR number 701 is set to the LPAR number of the LPAR 801, the logical CPU number 702 is set to the current logical CPU number, the threshold α 703 and the threshold β 704 are set to values defined in advance in the hypervisor 20, and the rest of the fields, 705 to 708, are set to "0".

In this flow chart, the LPAR management function 22 creates as many entries as the logical CPU count of the LPAR 801 (here, the LPAR 801 has the logical CPU 811), and adds the created entries to the bottom of the threshold management table 700. In the case where the logical CPU count of the LPAR 801 is to be reduced and in the case where the LPAR 801 is to be removed, the threshold management table 700 is searched with the LPAR number 701 and the logical CPU number 702 as indices, and an entry for the relevant logical CPU is deleted.

In the case where the logical CPU count of the LPAR 801 is to be increased, the threshold management table 700 is searched with the LPAR number 701 and the logical CPU number 702 as indices, and an entry is added by the same procedure that is used in Step 903, next to an entry that is largest in logical CPU number of all the existing entries.

Figure 11A:
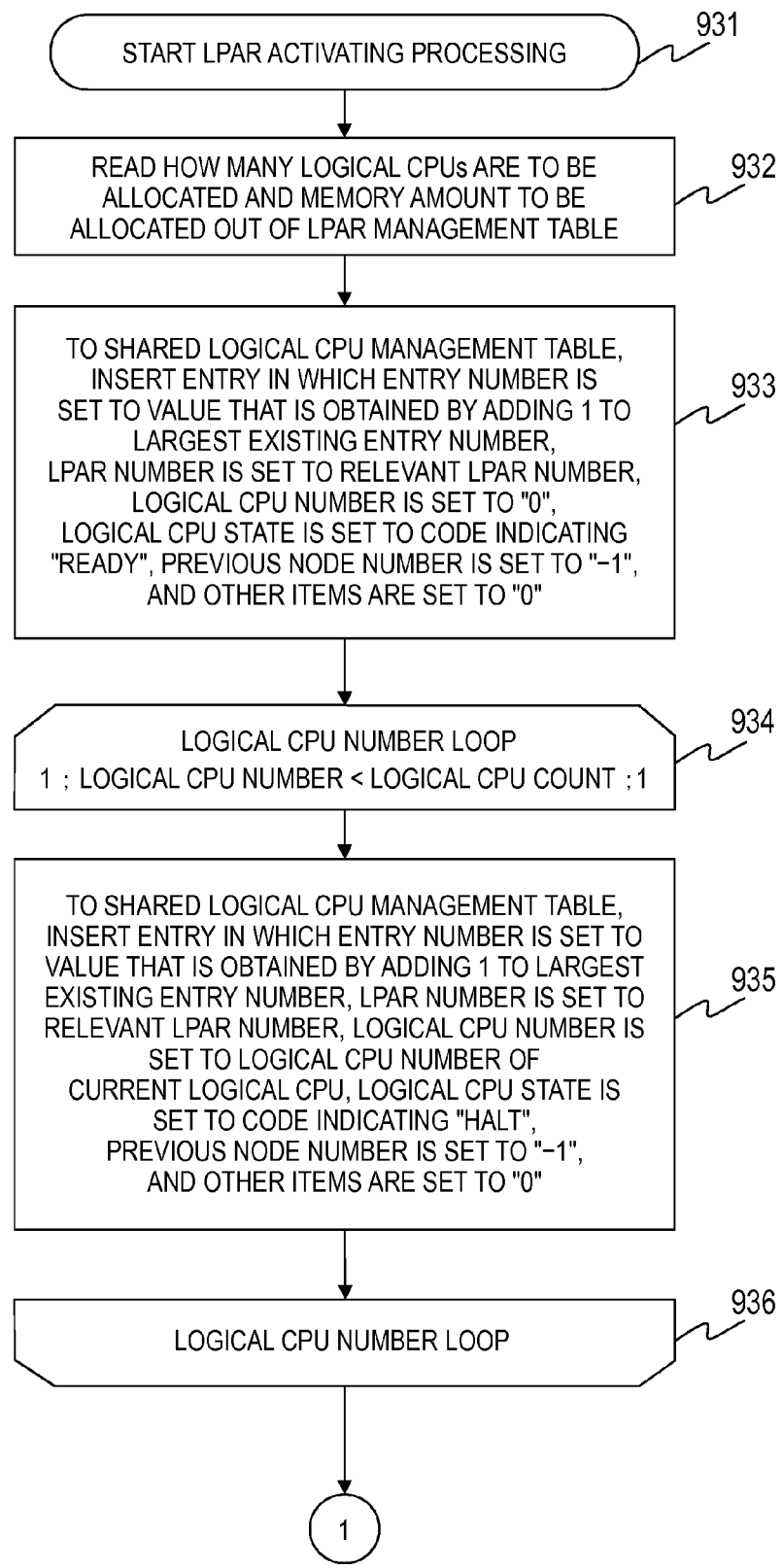
FIG. 11A is the first half of a flow chart for illustrating an example of processing that is executed in the hypervisor to activate the LPAR in the first embodiment of this invention.
Figure 11B:
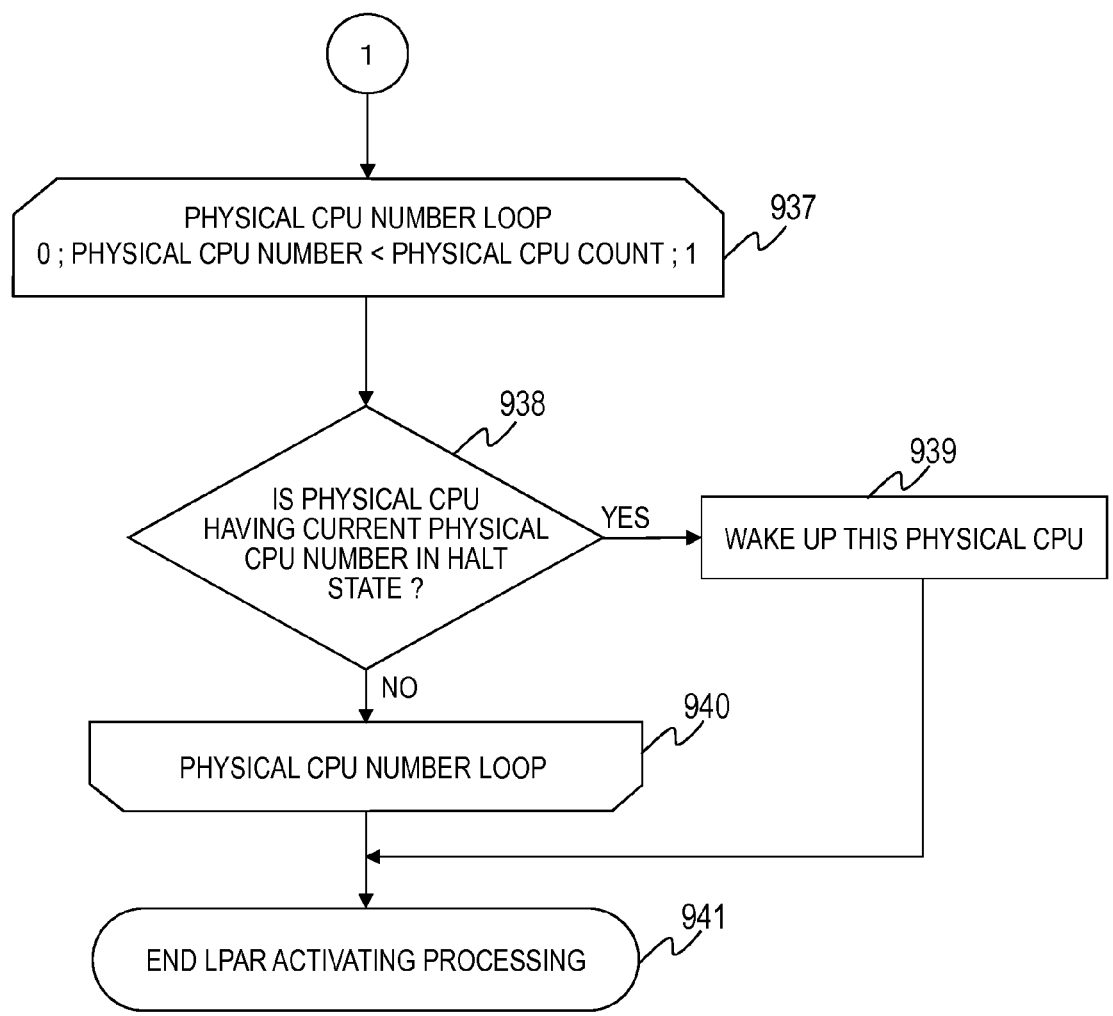
FIG. 11B is the latter half of the flow chart for illustrating an example of processing that is executed in the hypervisor to activate the LPAR in the first embodiment of this invention.

FIG. 11A is the first half of a flow chart for illustrating an example of processing that is executed in the hypervisor 20 to activate the LPAR 801 or 802, and FIG. 11B is the latter half of the flow chart.

In FIG. 11A and FIG. 11B, processing is illustrated in which the input/output function 21 of the hypervisor 20 receives via the input/output apparatus 13 a command to activate the LPAR 801 or 802, and the LPAR management function 22 activates the LPAR 801 or 802. In the following description of the processing, the LPAR to be activated is the LPAR 801.

This processing is executed by the hypervisor 20 when an instruction is received from the input/output apparatus 13.

The LPAR management function 22 of the hypervisor 20 reads out of the LPAR management table 100 the number of logical CPUs and a memory amount that are to be allocated to the LPAR 801 (932). The LPAR management function 22 inserts a new entry to the shared logical CPU management table 400. In the new entry, a value obtained by adding 1 to the largest existing entry number is set as the entry number 401, the LPAR number of the LPAR 801 is set as the LPAR number 402, "0" is set as the logical CPU number 403, "ready" is set as the logical CPU state 404, "−1", which means "undefined", is set as the previous node number 405, and "0" is set in the rest of the fields, 406 to 410 (933). However, the entry number 401 in the inserted entry is "1" in the case where the shared logical CPU management table 400 has been empty.

The LPAR management function 22 next repeats loop processing of Step 934 to Step 936 as many times as the number of the allocated logical CPUs.

First, the LPAR management function 22 repeats processing in which Step 935 is executed with the logical CPU number set to 1 and then 1 is added to the logical CPU number, as many times as the number of logical CPUs allocated to the LPAR 801 (934 to 936). Step 935 differs from Step 933 in that the logical CPU state 404 is set to "halt" and in that the logical CPU number 403 increases by 1 each time the loop is executed.

The LPAR management function 22 searches the physical CPU management table 200 for entries in which the physical CPU state 202 is "halt", in ascending order of physical CPU number (Steps 937, 938, and 940 of FIG. 11B). When detecting an entry that has "halt" as the physical CPU state 202, the LPAR management function 22 selects and activates this physical CPU (939).

Through the processing of the flow chart described above, the logical CPU 811 allocated to the LPAR 801 is registered in the shared logical CPU management table 400. The registered logical CPU is allocated some of the physical CPUs 4 to 7 by the scheduling function 24, and starts running.

Figure 12:
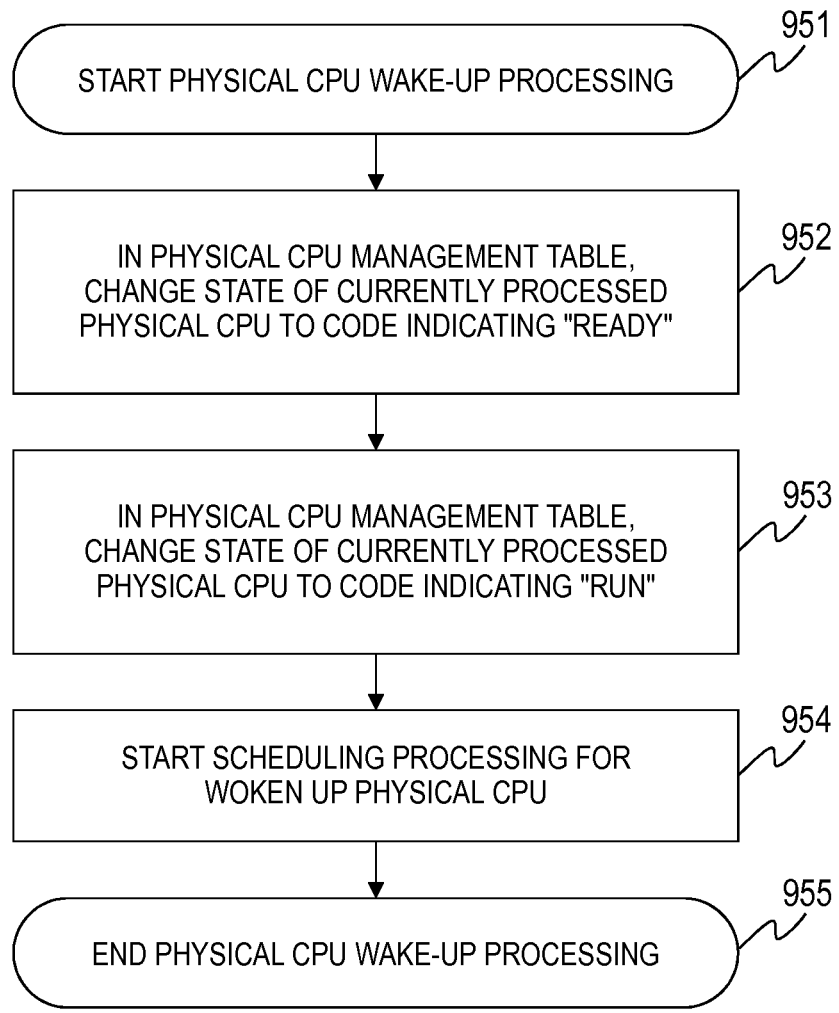
FIG. 12 is a flow chart for illustrating an example of processing that is executed in the hypervisor to wake up the physical CPUs in the first embodiment of this invention.

FIG. 12 is a flow chart for illustrating an example of processing that is executed in the hypervisor 20 to wake up the physical CPUs 4 to 7. In FIG. 12, the physical CPU wake-up function 23 of the hypervisor 20 wakes up one of the physical CPUs 4 to 7 that is in a halt state. Described below is an example of the processing in which one of the physical CPUs 4 to 7 that is to be woken up is the physical CPU 4.

The physical CPU wake-up function 23 of the hypervisor 20 updates the physical CPU state 202 in an entry of the physical CPU management table 200 that has the physical CPU number of the physical CPU 4 as the physical CPU number 201, with the code "2" of the CPU state table 450 of FIG. 4A, which corresponds to a shift from "halt" to "ready" (952). Thereafter, the physical CPU wake-up function 23 updates the state 202 of physical CPU 4 in the physical CPU management table 200 with the code "1", which corresponds to "run" (953).

The hypervisor 20 uses the scheduling function 24 to perform scheduling processing on the physical CPU 4 woken up by the physical CPU wake-up function 23 (954).

Changes that are caused by the activation of the LPAR #1 (801) in the tables that are in the state of FIG. 2, FIG. 3, and FIG. 5 to FIG. 9 are shown in FIG. 13 and FIG. 14.

FIG. 13 is a diagram for showing an example of how the physical CPU management table 200 looks after the processing of activating the LPAR 801. FIG. 14 is a diagram for showing an example of how the shared logical CPU management table 400 looks after the processing of activating the LPAR 801.

The logical CPU count of the LPAR #1 (801) is 1 (the logical CPU 811) and, to the shared logical CPU management table 400 of FIG. 6, which is an empty table, an entry where the entry number 411 is "1" is newly inserted by Step 933 of FIG. 11A.

Thereafter, because the physical CPU state 202 is "3", which indicates "halt", in all entries of the physical CPU management table 200 in FIG. 3, the physical CPU #0 (4) is woken up by Step 937 to Step 940 of FIG. 11B as a physical CPU that has the smallest physical CPU number 403. Through the physical CPU wake-up processing of FIG. 12, the physical CPU state 202 changes from "3", which indicates "halt", to "2", which indicates "ready", and then to "1", which indicates "run", in an entry of the physical CPU management table 200 that has "0" as the physical CPU number 201.

There are no changes in the LPAR management table 100, the specific logical CPU management tables 300, the temporarily stored logical CPU management table entries 500, the temporary calculation tables 600, and the threshold management table 700.

Figure 15:
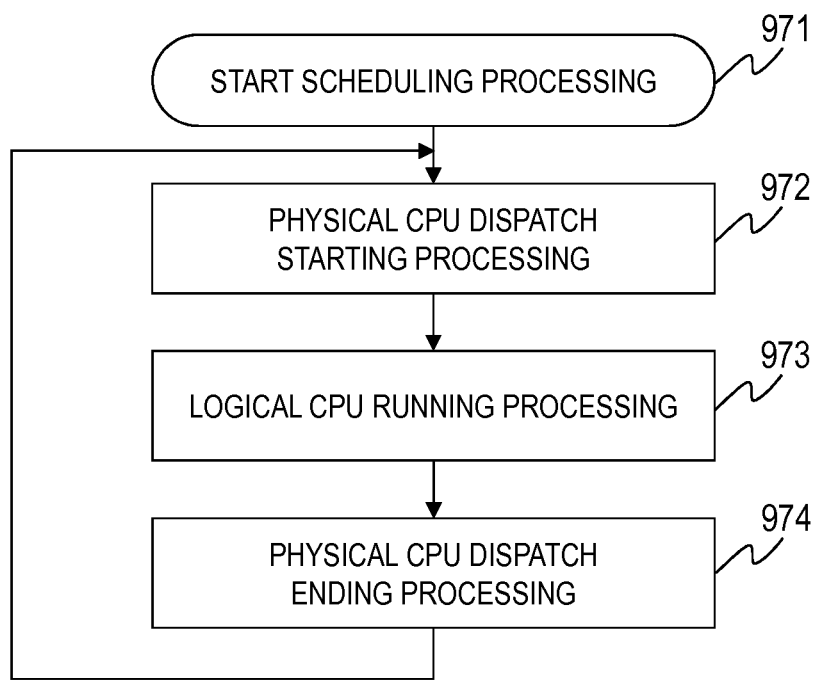
FIG. 15 is a flow chart for illustrating the outline of the scheduling processing executed by the hypervisor in the first embodiment of this invention.

FIG. 15 is a flow chart for illustrating the outline of the scheduling processing executed in the hypervisor 20.

This processing includes roughly three processing procedures: physical CPU dispatch starting processing (972) for selecting, for each of the physical CPUs 4 to 7, which of the logical CPUs 811 and 812 is to be run by the physical CPU, logical CPU running processing (973) for running the logical CPUs 811 and 812 by the physical CPUs 4 to 7, and physical CPU dispatch ending processing (974) for selecting, for each of the logical CPUs 811 and 812 finished with time division processing, which of the physical CPUs 4 to 7 is to run the logical CPU. The scheduling function 24 of the hypervisor 20 executes the processing of Step 972 to the processing of Step 974 repeatedly.

The scheduling function 24 executes the scheduling processing for one of the physical CPUs 4 to 7 and, when the computer system includes a plurality of physical CPUs, a plurality of scheduling processing threads are executed in parallel. In the following description, one of the physical CPUs 4 to 7 for which the scheduling function 24 executes the scheduling processing is the physical CPU 4.

Figure 16A:
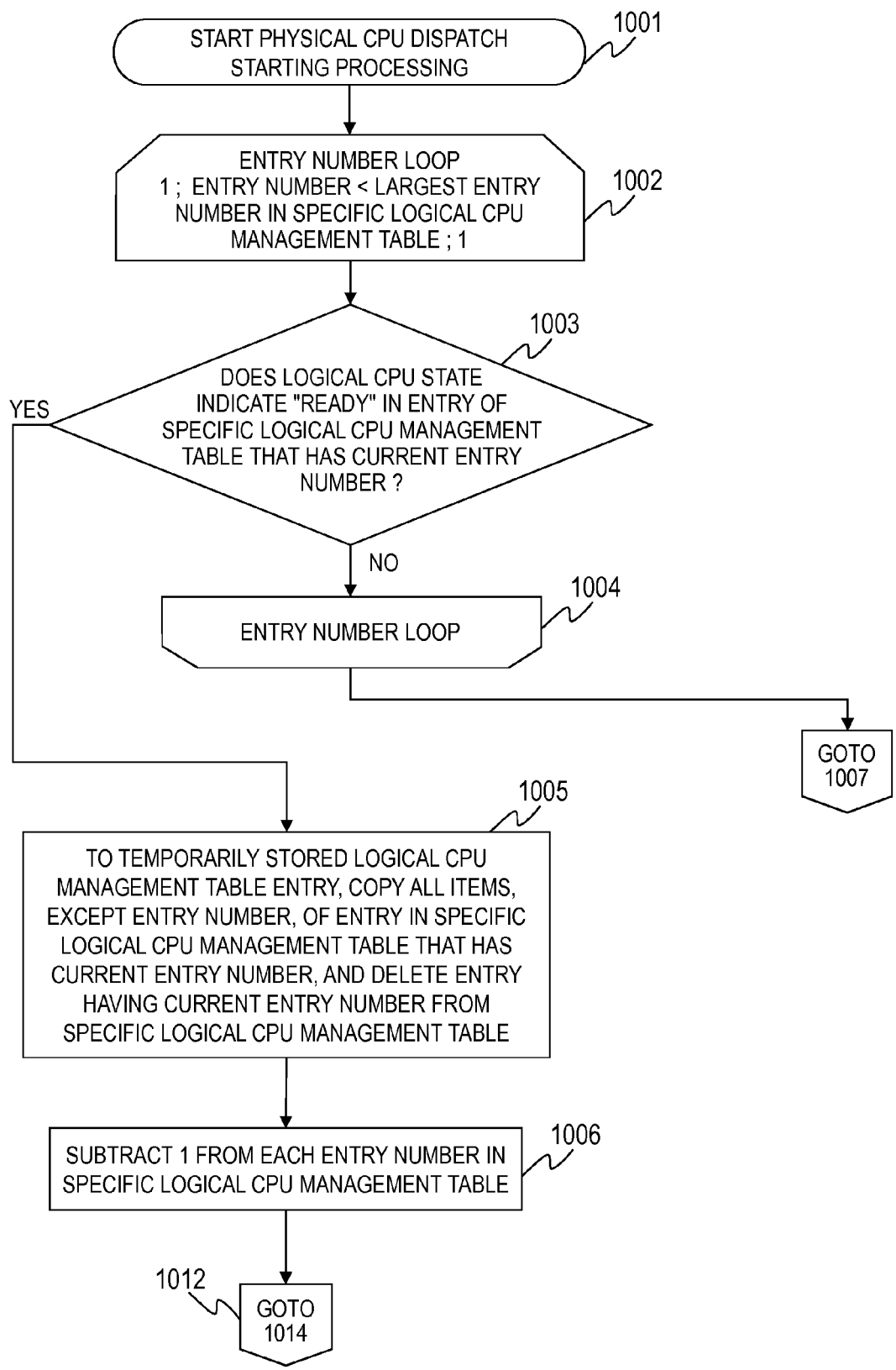
FIG. 16A is the first part of the physical CPU dispatch starting processing in the first embodiment of this invention.
Figure 16B:
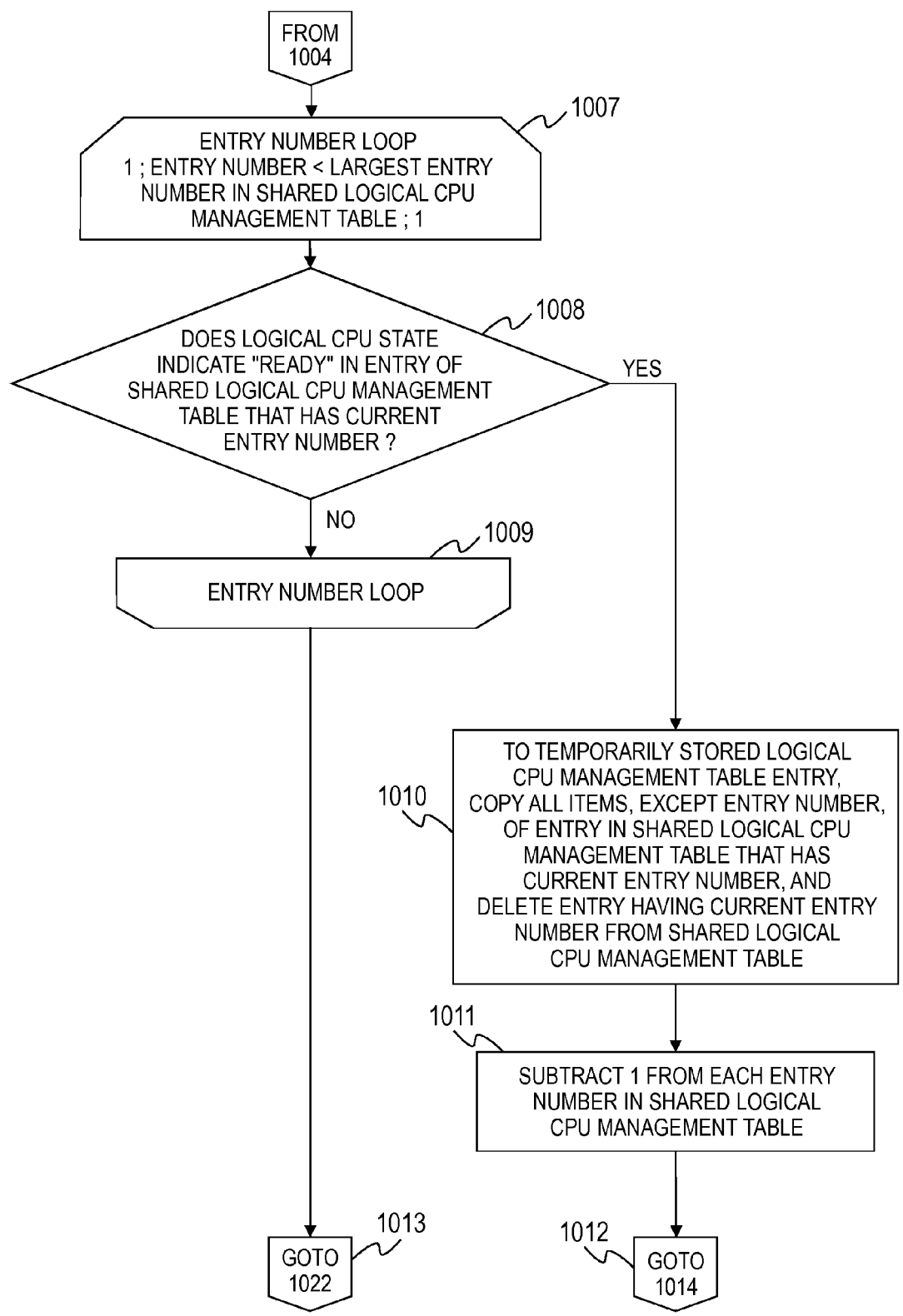
FIG. 16B is the middle part of the physical CPU dispatch starting processing in the first embodiment of this invention.
Figure 16C:
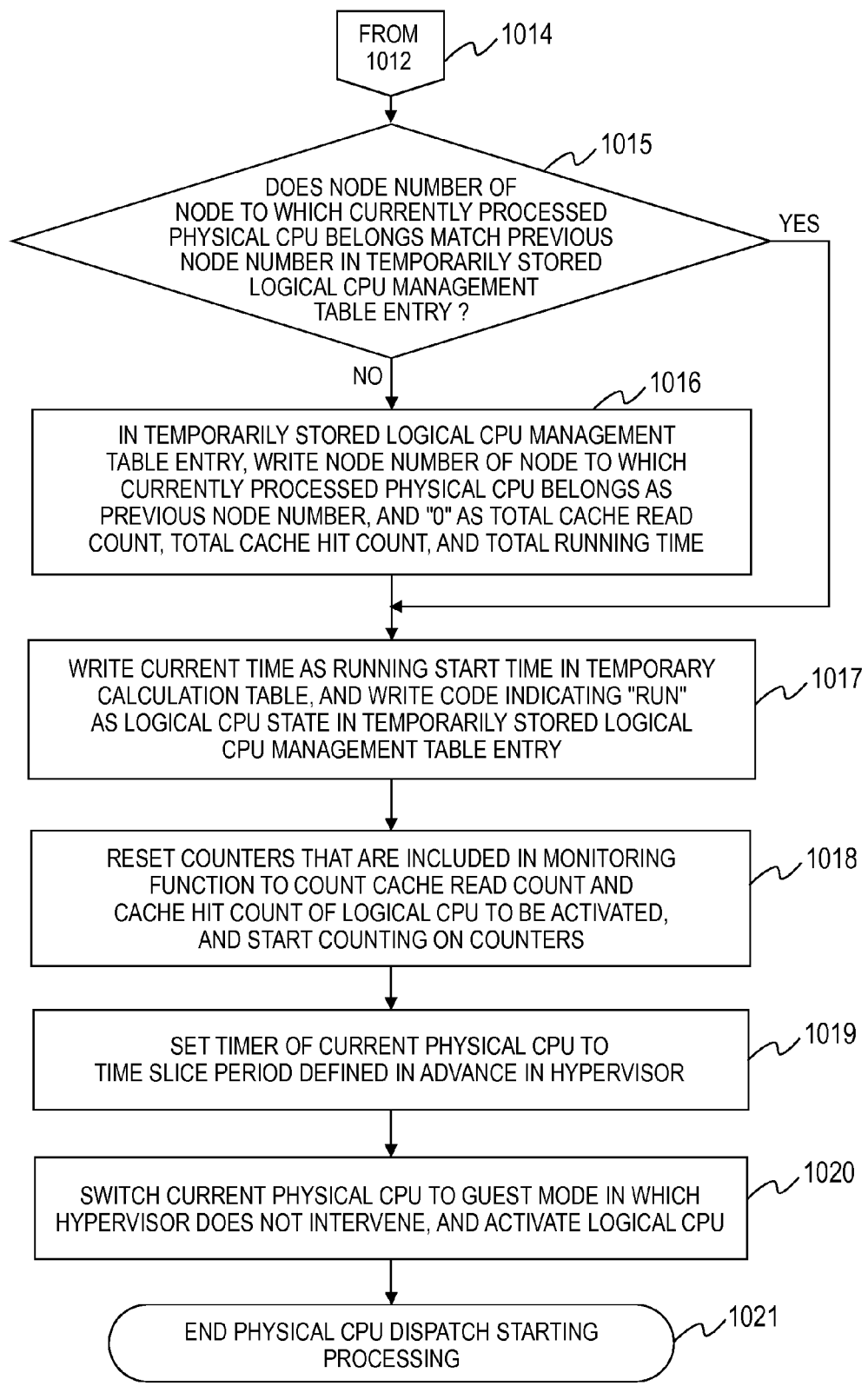
FIG. 16C is the last part of the physical CPU dispatch starting processing in the first embodiment of this invention.
Figure 16D:
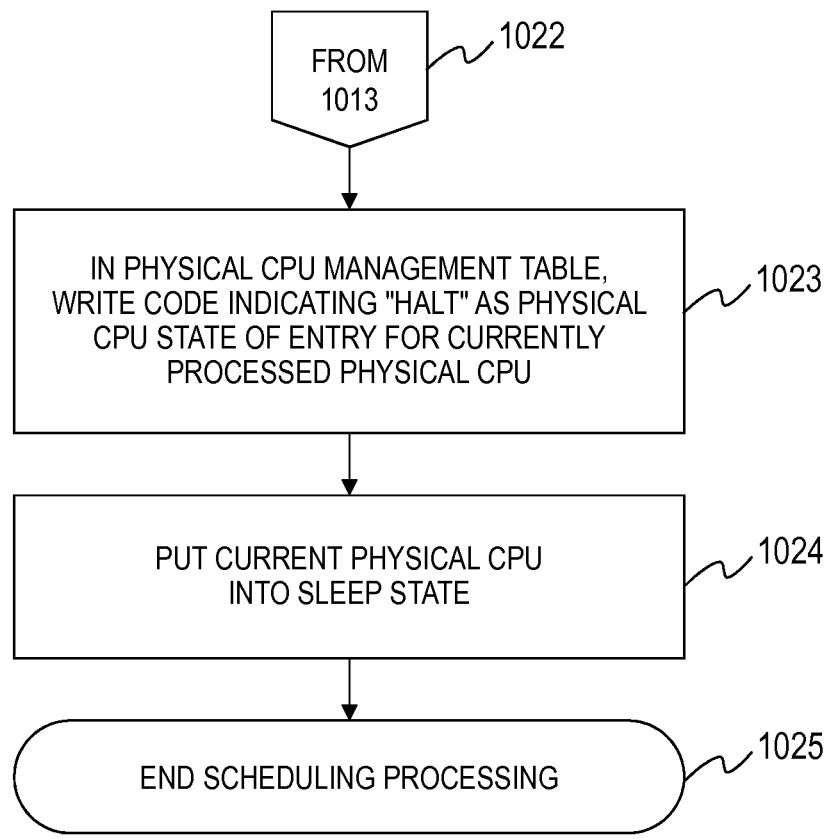
FIG. 16D is a flow chart of a case where there is no logical CPU to be processed by the physical CPU dispatch starting processing in the first embodiment of this invention.

FIG. 16A, FIG. 16B, FIG. 16C, and FIG. 16D are flow charts for illustrating an example of the physical CPU dispatch starting processing (972). FIG. 16A is the first part of the physical CPU dispatch starting processing, FIG. 16B is the middle part thereof, and FIG. 16C is the last part thereof. FIG. 16D is a flow chart of a case where there is no logical CPU to be processed by the physical CPU dispatch starting processing.

The physical CPU dispatch starting processing (972) begins with Step 1001 of FIG. 16A. The scheduling function 24 searches the specific logical CPU management table 300 of the physical CPU 4 for entries where the logical CPU state 304 is "2", which indicates "ready", from the smallest entry number upward (1002 to 1004). When finding an entry where the logical CPU state 304 is "2", which indicates "ready", the scheduling function 24 proceeds to Step 1005.

In the case where an entry that has "2" meaning "ready" as the logical CPU state 304 is not found in the specific logical CPU management table 300, on the other hand, the scheduling function 24 proceeds to Step 1007 of FIG. 16B.

The case where the search in Step 1002 to Step 1004 has found an entry that has "2" meaning "ready" as the logical CPU state 304 in the specific logical CPU management table 300 is described first.

The scheduling function 24 copies all items but the entry number 301 of the entry where the logical CPU state 304 indicates "ready" to the relevant temporarily stored logical CPU management table entry 500, and deletes this entry from the specific logical CPU management table 300 (1005).

The scheduling function 24 subtracts 1 from the entry number 301 in every entry of the specific logical CPU management table 300 (1006), and proceeds to Step 1012, namely, Step 1014 of FIG. 16C.

Described next is the case where the search in Step 1002 to Step 1004 has not found an entry that has "2" meaning "ready" as the logical CPU state 304 in the specific logical CPU management table 300.

The scheduling function 24 searches the shared logical CPU management table 400 for entries in which the value of the logical CPU state 404 is "2", which indicates "ready", from the smallest entry number 401 upward (1007 to 1009). When an entry that has "2" meaning "ready" as the value of the logical CPU state 404 is found in Step 1008, the scheduling function 24 proceeds to Step 1010.

In the case where an entry in which the logical CPU state 404 indicates "ready" is not found in the shared logical CPU management table 400 either, the scheduling function 24 proceeds to Step 1013, namely, Step 1022 of FIG. 16D.

In the case where an entry in which the logical CPU state 404 indicates "ready" is found in the shared logical CPU management table 400, the same step as Step 1005 is executed. Specifically, the scheduling function 24 copies all items but the entry number 401 of the entry found in the shared logical CPU management table 400 to the relevant temporarily stored logical CPU management table entry 500, and deletes this entry from the shared logical CPU management table 400 (1010).

Thereafter, the scheduling function 24 subtracts 1 from the entry number 401 in every entry of the shared logical CPU management table 400 (1011), and proceeds to Step 1012, namely, Step 1014 of FIG. 16C.

In Step 1014 of FIG. 16C and subsequent steps, the scheduling function 24 determines whether or not the node number of a node to which the physical CPU 4 belongs matches the previous node number 504 of the temporarily stored logical CPU management table entry 500 (1015). The scheduling function 24 proceeds to Step 1016 when the node numbers do not match, and proceeds to Step 1017 when the node numbers match.

The scheduling function 24 executes processing of writing the node number of a node to which the physical CPU 4 belongs as the previous node number 504 in the temporarily stored logical CPU management table entry 500, and processing of writing "0" as the total cache read count 505, the total cache hit count 506, and the total running time 507 (1016).

The scheduling function 24 next writes the current time as the running start time 604 in the relevant temporary calculation table 600, and a code indicating "run" as the logical CPU state 503 in the temporarily stored logical CPU management table entry 500 (1017).

The scheduling function 24 resets counters included in the monitoring function 25. The scheduling function 24 resets counters that are provided in the monitoring function 25 to count the cache read count and cache hit count of the logical CPU 811 or 812 to be activated, and starts these counts on the counters (1018).

One of the timers 16 to 19 of the physical CPUs 4 to 7 that is the timer of the physical CPU currently being processed, here, the timer 16 of the physical CPU 4, is set to the period (or cycle) of the time slice that is defined in advance in the hypervisor 20 (1019). When the time slice period elapses, a timer interrupt in which the timer 16 (one of 17 to 19) ends the guest mode takes place in the physical CPU 4 (5 to 7).

The timer interrupt by the timer 16 (17 to 19) causes a switch to a host mode in which the hypervisor 20 takes control.

The scheduling function 24 switches one of the physical CPUs 4 to 7 that is being processed, here, the physical CPU 4, to the guest mode in which the hypervisor 20 does not intervene, activates the logical CPU 811 or 812 (1020), and finishes the physical CPU dispatch starting processing (972) (1021).

In Step 1022 of FIG. 16D and subsequent steps, the scheduling function 24 writes "3", which corresponds to "halt", as the physical CPU state 202 of an entry for the physical CPU 4 in the physical CPU management table 200 (1023).

The scheduling function 24 puts the physical CPU 4 into a sleep state (1024), and ends the scheduling processing (1025).

Processing described below is executed in the flow charts of FIG. 16A, FIG. 16B, FIG. 16C, and FIG. 16D.

The scheduling function 24 preferentially selects the logical CPU 811 (812) as a logical CPU whose entry number 301 is small in the relevant specific logical CPU management table 300, and sets the selected logical CPU as a logical CPU to be run by one of the physical CPUs 4 to 7 that is being processed, here, the physical CPU 4.

When there is no entry in the specific logical CPU management table 300 that has "2" corresponding to "ready" as the logical CPU state 304, the scheduling function 24 searches the shared logical CPU management table 400 for an entry that similarly has "2" corresponding to "ready" as the logical CPU state 404 to select the logical CPU 811 (812). In the case where the entry is still not found, it means that there is no job to be processed by the physical CPU 4, and the scheduling function 24 accordingly puts the physical CPU 4 into a sleep state.

By executing this processing in the physical CPU dispatch starting processing (972), the scheduling function 24 preferentially selects an entry for the logical CPU 811 (812) where the logical CPU state 304 indicates "ready" from the specific logical CPU management table 300 of the physical CPU 4. The scheduling function 24 inserts a new entry for the logical CPU 811 to the specific logical CPU management table 300, thereby ensuring that the logical CPU 811 is run by the physical CPU 4.

In the case where a logical CPU to be run is not found in the specific logical CPU management table 300, the scheduling function 24 obtains an entry from the shared logical CPU management table 400, which holds entries for logical CPUs that can be run by any of the physical CPUs 4 to 7 out of the logical CPUs 811 and 812. This guarantees that a logical CPU in the "ready" state is run by one of the physical CPUs 4 to 7.

Figure 17A:
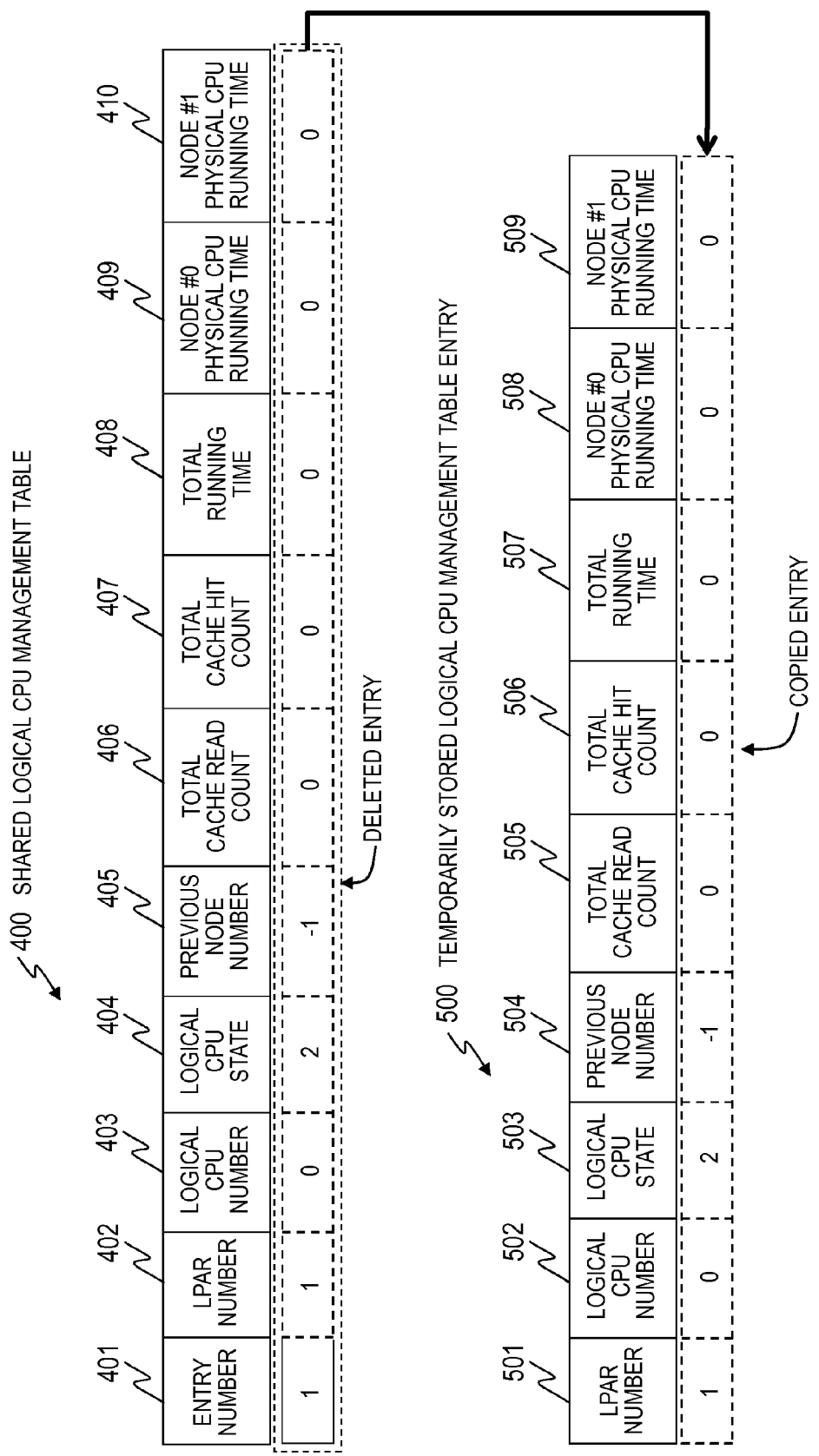
FIG. 17A is a diagram for showing a relationship of the shared logical CPU management table and the temporarily stored logical CPU management table entries in the first embodiment of this invention.
Figures 17B, 18:
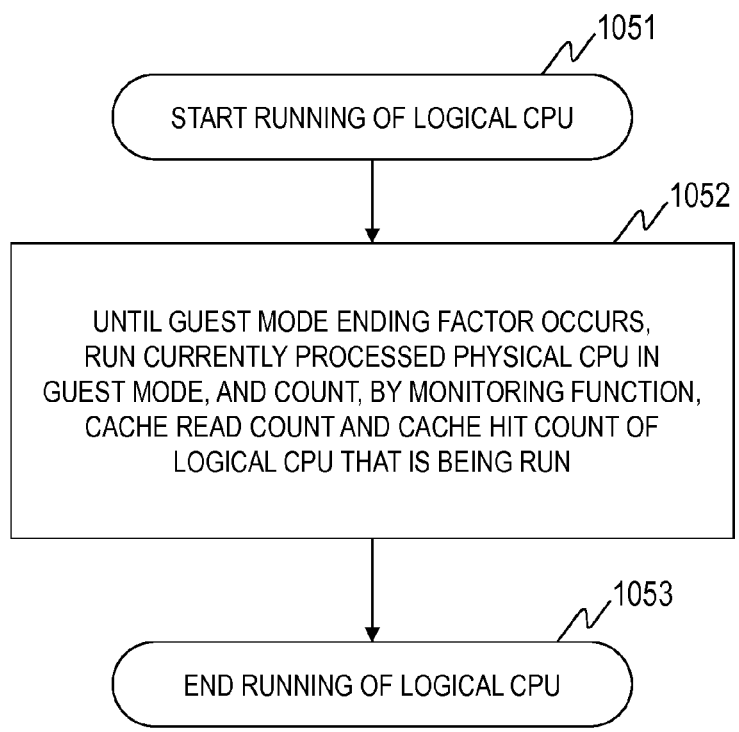
FIG. 17B is a diagram for showing the temporary calculation table in the first embodiment of this invention.
FIG. 18 is a flow chart for illustrating an example of the logical CPU running processing of FIG. 15 in the first embodiment of this invention.

As an example, results of the processing of the flow charts of FIG. 16A, FIG. 16B, FIG. 16C, and FIG. 16D that are obtained when the scheduling function 24 executes the scheduling processing for the physical CPU #0 (4) in Step 954 of the flow chart of FIG. 12, with the computer system being in the state of FIG. 2, FIG. 5, FIG. 7, FIG. 13, and FIG. 14, are shown in FIG. 17A and FIG. 17B. The reason that the results are as shown in FIG. 17A and FIG. 17B is described below.

In the state of FIG. 13 and FIG. 14, the relevant specific logical CPU management table 300 has no entry and the shared logical CPU management table 400 has one entry. Accordingly, in Steps 1007 to 1009, the scheduling function 24 copies other items 402 to 410 than the entry number 401 to the relevant temporarily stored logical CPU management table entry 500 from an entry of the shared logical CPU management table 400 that indicates "ready" as the logical CPU state and that has the smallest entry number 401, and then deletes this entry from the shared logical CPU management table 400.

The shared logical CPU management table 400 has now no entries, and Step 1010 of FIG. 16B is therefore not executed at this point.

In the entry for the logical CPU #0 that has been created by the scheduling function 24 by copying to the temporarily stored logical CPU management table entry 500, because the logical CPU #0 is run for the first time by the physical CPUs 4 and 5, which belong to the node #0, the previous node number 504 is changed to "0" and the total cache read count 505, the total cache hit count 506, and the total running time 507 are initialized to "0" through Steps 1015 and 1016 of FIG. 16C.

In Step 1017, the current time is written as the running start time 604 in the relevant temporary calculation table 600, and the logical CPU state 503 of the temporarily stored logical CPU management table entry 500 is updated with a value "1", which corresponds to "run". In Steps 1018 to 1020, the physical CPU #0 (4) is switched to the guest mode. The running start time 604 at which the processing is started is "200" in Step 1017 as shown in FIG. 17B. The physical CPUs 4 to 7 each include a virtualization assisting function, and have the host mode in which the hypervisor 20 is run and the guest mode in which a guest OS is run.

FIG. 18 is a flow chart for illustrating an example of the logical CPU running processing (973) of FIG. 15. The specifics of this processing include running the physical CPU #0 (4) in the guest mode until a factor for ending the guest mode of the physical CPU #0 (4) occurs, and using the monitoring function 25 to count the cache read count and cache hit count of the logical CPU 811, which is being run (1052).

Codes of guest mode ending factors, the factors, and resultant logical CPU states are defined in advance in the hypervisor, and are identified with the use of a logical CPU ending factor code-logical CPU state association table, an example of which is shown in FIG. 19.

FIG. 19 is a diagram for showing an example of the factor code table 460, which holds guest mode ending factor codes. The factor code table 460 includes in each entry a factor code 461, which indicates a command for ending the guest mode, a factor 462, which indicates the name of the factor, and a logical CPU state 463, which indicates a logical CPU state after the factor code is executed.

Figure 20A:
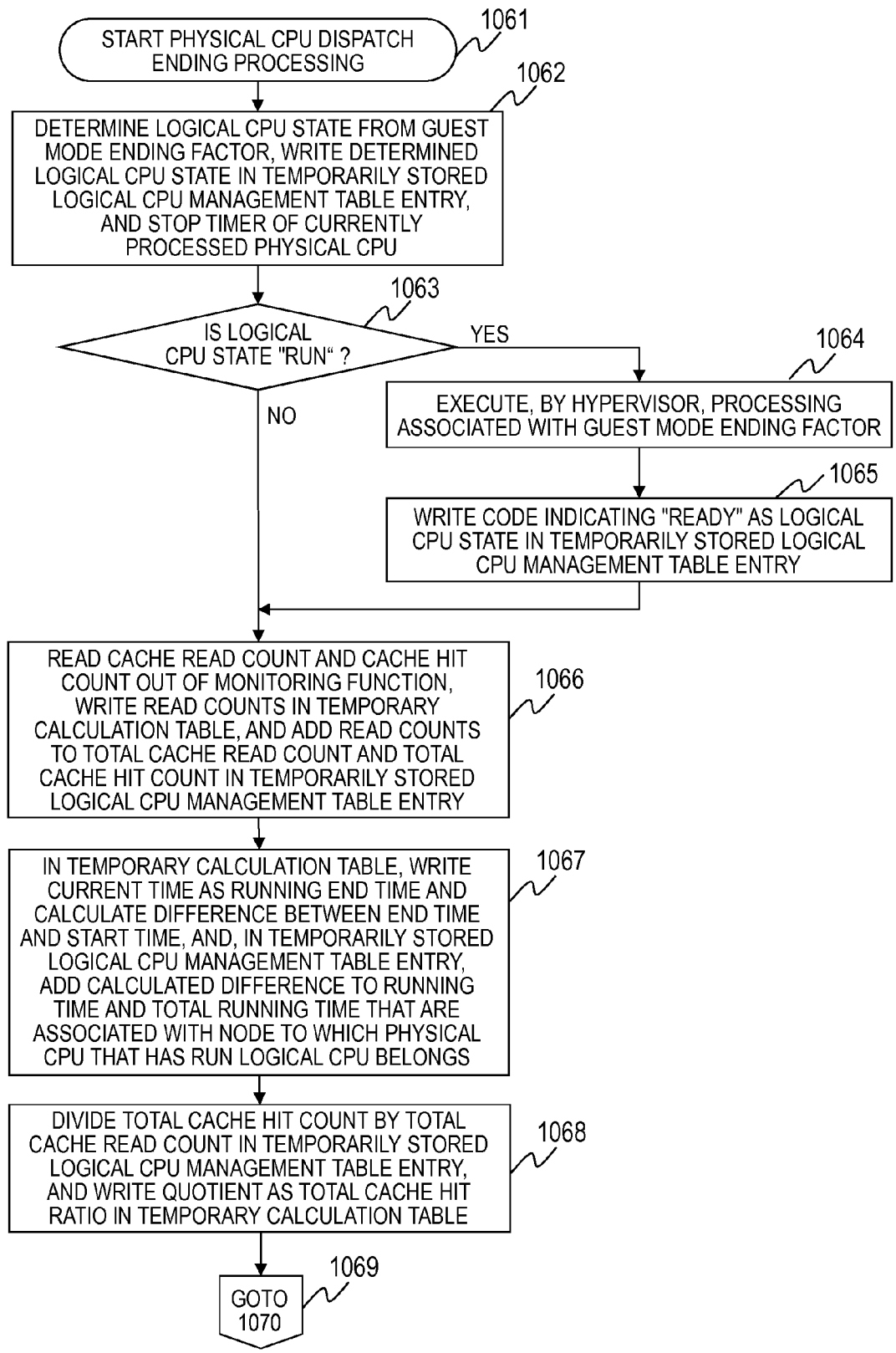
FIG. 20A is the first part of the physical CPU dispatch ending processing in the first embodiment of this invention.
Figure 20B:
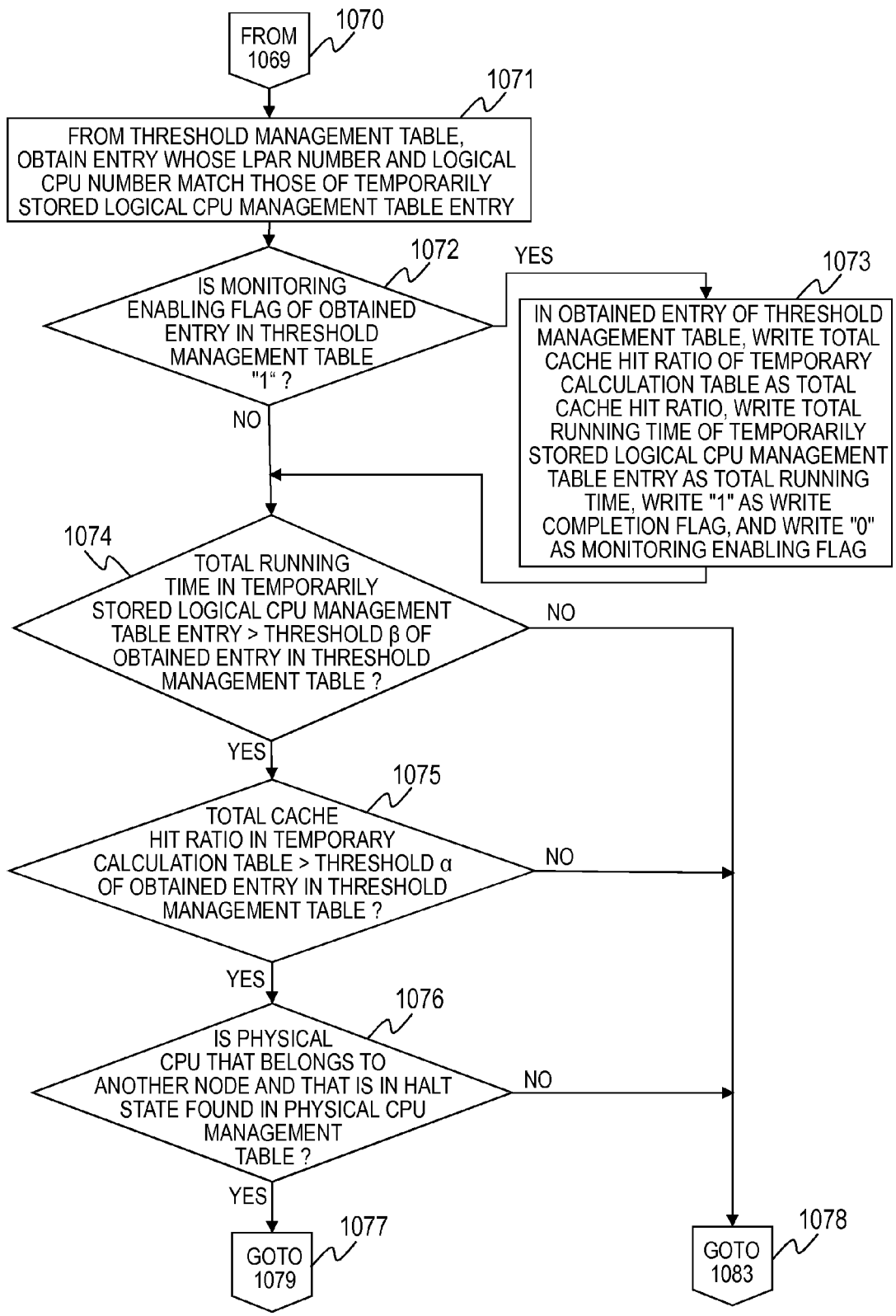
FIG. 20B is the middle part of the physical CPU dispatch ending processing in the first embodiment of this invention.
Figure 20C:
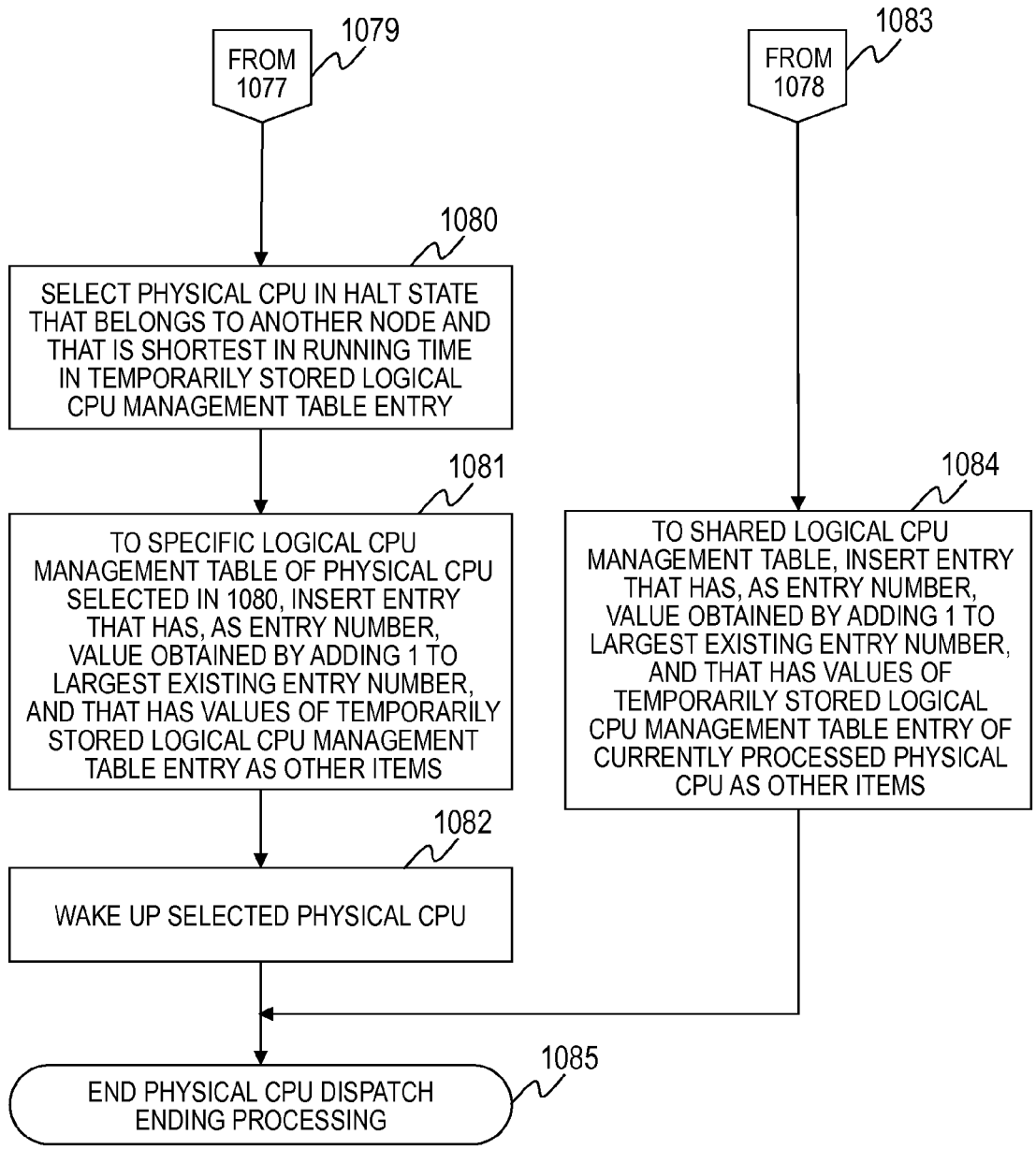
FIG. 20C is the last part of the physical CPU dispatch ending processing in the first embodiment of this invention.

FIG. 20A, FIG. 20B, and FIG. 20C are flow charts for illustrating an example of the physical CPU dispatch ending processing (974) of FIG. 15. When the logical CPU 811 finishes the guest mode, the physical CPU dispatch ending processing (974) begins with Step 1061 of FIG. 20A. FIG. 20A is the first part of a flow chart for illustrating an example of the physical CPU dispatch ending processing of the scheduling processing. FIG. 20B is the middle part of the physical CPU dispatch ending processing, and FIG. 20C is the last part thereof.

The scheduling function 24 refers to the factor code table 460 to determine a logical CPU state that is associated in the factor code table 460 of FIG. 19 with the factor of the end of the guest mode in the logical CPU 811, and writes the determined logical CPU state as the logical CPU state 503 in the temporarily stored logical CPU management table entry 500. The scheduling function 24 then stops the timer 16 set for the physical CPU #0 (4) (1062). Determining the logical CPU state from the ending factor is executed by the scheduling function 24 by referring to the factor code table 460 of FIG. 19.

In the case where the logical CPU state 503 of the temporarily stored logical CPU management table entry 500 is "1", which corresponds to "run" (Yes in 1063), the scheduling function 24 executes processing that is associated with a guest mode ending factor defined in advance in the factor code table 460 of the hypervisor 20 (1064), and writes "2", which corresponds to "ready" as the logical CPU state 503 in the temporarily stored logical CPU management table entry 500 (1065). Step 1064 also includes processing that is executed when the logical CPU 811 uses up the time slice period, and the processing in this case corresponds to an interrupt by the timer of the physical CPU #0 (4).

The scheduling function 24 next reads the cache read count and cache hit count of the logical CPU 811 out of the monitoring function 25, and writes the counts in the relevant fields 602 and 603 of the temporary calculation table 600. The scheduling function 24 also adds the read cache read count and cache hit count to the total cache read count 505 and the total cache hit count 506, respectively, in the temporarily stored logical CPU management table entry 500 (1066).

The scheduling function 24 writes the current time as the running end time 605 in the temporary calculation table 600, and calculates a difference between the running end time 605 and the running start time 604. In the temporarily stored logical CPU management table entry 500, the scheduling function 24 adds the calculated difference to one of the running time 508 and the running time 509 that is associated with the node of the physical CPU #0, which has run the logical CPU 811 (1067). The scheduling function 24 also adds the calculated difference to the total running time 708 in the threshold management table 700 (1067).

The scheduling function 24 divides the total cache hit count 506 by the total cache read count 505 in the temporarily stored logical CPU management table entry 500, and writes the quotient as the total cache hit ratio 601 in the temporary calculation table 600 (1068).

The scheduling function 24 next obtains from the threshold management table 700 an entry whose LPAR number and logical CPU number match the LPAR number 501 and logical CPU number 502 of the temporarily stored logical CPU management table entry 500 (1071 of FIG. 20B).

In the following description, the entry obtained from the threshold management table 700 is referred to as target entry of the threshold management table 700.

The scheduling function 24 determines whether or not the monitoring enabling flag 705 is "1" in the target entry of the threshold management table 700 (1072). The scheduling function 24 proceeds to Step 1073 when the monitoring enabling flag 705 is "1", and otherwise proceeds to Step 1074.

In the target entry of the threshold management table 700, the scheduling function 24 writes the total cache hit ratio 601 of the temporary calculation table 600 and the total running time 507 of the temporarily stored logical CPU management table entry 500 as the total cache hit ratio 707 and the total running time 708, respectively, writes "1" as the write completion flag 706, and writes "0" as the monitoring enabling flag 705 (1073).

The scheduling function 24 determines whether or not the total running time 507 of the temporarily stored logical CPU management table entry 500 is greater than the threshold β 704 of the target entry of the threshold management table 700 (1074). The scheduling function 24 proceeds to Step 1075 when the total running time 507 is greater than the threshold β 704, and proceeds to Step 1078 when the total running time 507 is equal to or less than the threshold β 704.

In Step 1075, the scheduling function 24 determines whether or not the total cache hit ratio 601 of the temporary calculation table 600 is less than the threshold α 703 of the target entry of the threshold management table 700. The scheduling function 24 proceeds to Step 1076 when the total cache hit ratio 601 is less than the threshold α 703, and proceeds to Step S1078 when the total cache hit ratio 601 is equal to or more than the threshold α 703.

In Step 1076, the scheduling function 24 refers to the physical CPU management table 200 to determine whether or not a physical CPU in a halt state is found in a node that is not the one to which the physical CPU #0 (4) belongs. The scheduling function 24 proceeds to Step 1077 when a physical CPU in a halt state is found in a node that is not the node of the physical CPU #0 (4), and proceeds to Step 1078 when none of other nodes has a physical CPU in a halt state.

When it is found out from the plurality of determination steps described above that the total running time 507 of the temporarily stored logical CPU management table entry 500 is greater than the threshold β 704, that the total cache hit ratio 601 is less than the threshold α 703, and that a node that is not the node of the physical CPU #0 (4) has a physical CPU in a halt state, the scheduling function 24 proceeds from Step 1077 to Step 1079 of FIG. 20C. When the answer is "No" in even one of the determination steps of Steps 1074 to 1076, the scheduling function 24 proceeds from Step 1078 to Step 1083 of FIG. 20C.

The scheduling function 24 proceeds from Step 1079 to Step 1080 to execute in Steps 1080 to 1082 processing described below.

The scheduling function 24 selects a physical CPU in a halt state that belongs to another node and that is shortest in terms of the running time 508 or 509 in the relevant temporarily stored logical CPU management table entry 500 (1080).

The scheduling function 24 inserts a new entry to the specific logical CPU management table 300 of the physical CPU selected in Step 1080, with a value that is obtained by adding 1 to the largest existing entry number 301 as the new entry number 301, and sets the values of the temporarily stored logical CPU management table entry 500 as the other items of the new entry (1081). In the case where the specific logical CPU management table 300 has no entries, however, "1" is set as the entry number 301 of the inserted entry.

The scheduling function 24 uses the physical CPU wake-up function 23 of the hypervisor 20 to wake up the physical CPU selected in Step 1080 (1082).

When the answer is "No" in even one of the determination steps of Steps 1074 to 1076, on the other hand, the scheduling function 24 proceeds from Step 1083 to Step 1084. In Step S1084, a new entry is inserted to the shared logical CPU management table 400 with a value that is obtained by adding 1 to the largest existing entry number 401 as the new entry number 401, and values of the temporarily stored logical CPU management table entry 500 of the physical CPU #0 (4) are set as other items of the new entry (1084). In the case where the shared logical CPU management table 400 has no entries, however, "1" is set as the entry number 401 of the inserted entry.

At the completion of Step 1082 or Step 1084, the physical CPU dispatch ending processing is finished (1085).

Processing described below is executed in the flow charts of FIG. 20A, FIG. 20B, and FIG. 20C.

After the guest mode of the logical CPU is ended and, depending on the logical CPU state 503, the hypervisor 20 executes post-processing, the scheduling function 24 obtains from the monitoring function 25 the cache read count and the cache hit count that have been counted while the logical CPU has been run, and calculates and updates the total cache hit ratio 707 and the total running time 708, which are statistical information.

In the case where the logical CPU 811 has been run continuously by physical CPUs of the same node for a period of time that exceeds the threshold β 704 of the total running time 708, the scheduling function 24 determines whether the cache memory 8 or 9 is utilized effectively by comparing the total cache hit ratio 707 with the threshold α.

When the total cache hit ratio 707 is less than the threshold α and a physical CPU in a halt state is found in another node, an entry for the logical CPU 811, which has been run, is added to the relevant specific logical CPU management table 300 so that the logical CPU 811 is run by the physical CPU of the other node. The physical CPU that runs a logical CPU can thus be switched from a physical CPU in one node to a physical CPU in another node, then to a physical CPU in still another node, and so on. In this manner, when the memory access performance of the logical CPU 811 is measured for a period of time that exceeds the threshold β, the cost of accessing the physical memory 10 from the logical CPU 811 and the cost of accessing the physical memory 11 from the logical CPU 811 can be varied from each other.

Specifically, access to data or the like by a program that is executed by the logical CPU 811 is local access when the data or the like is stored in the physical memory 10, which belongs to the same node as the physical CPU 4, and is remote access when the data or the like is stored in the physical memory 11, which belongs to a different node. Local access and remote access differ from each other in access cost, namely, latency.

When the total cache hit ratio 707 is greater than the threshold α, it means that the logical CPU 811 is benefiting from the cache memory 8, and continuing to run the logical CPU 811 by the physical CPUs 4 and 5, which belong to the same node, is permitted. An entry for the logical CPU 811, which has been run, is therefore added to the shared logical CPU management table 400.

In the case where at least one of the physical CPUs 6 and 7, which belong to another node, is not in the halt state at this point, the scheduling processing could be executed for the physical CPU 6 or 7 of the other node to extract an entry for the logical CPU 811 from the shared logical CPU management table 400 and run the logical CPU 811 by the physical CPU 6 or 7. In this case, however, the cost of accessing the physical memory 10 from the logical CPU 811 and the cost of accessing the physical memory 11 from the logical CPU 811 can be varied from each other when the memory access performance is measured for the time period T, which exceeds the threshold β, by the same principle as that of randomness observed while the entire virtual computer system is busy as described later.

When a physical CPU in a halt state is found in none of other nodes, it means that the entire virtual computer system is busy and, as described later, the randomness takes effect in one of the physical CPUs 4 to 7 that is allocated the logical CPU 811.

In order to utilize this feature, an entry for the logical CPU 811, which has been run, is added to the shared logical CPU management table 400 so that the selection out of the logical CPUs 811 and 812 is random in the physical CPU dispatch starting processing (972). Consequently, when the memory access performance of the logical CPU 811 or 812 is measured for the time period T, which exceeds the threshold β, the cost of accessing the physical memory 10 from the logical CPU and the cost of accessing the physical memory 11 from the logical CPU can be varied from each other.

Figure 21C:
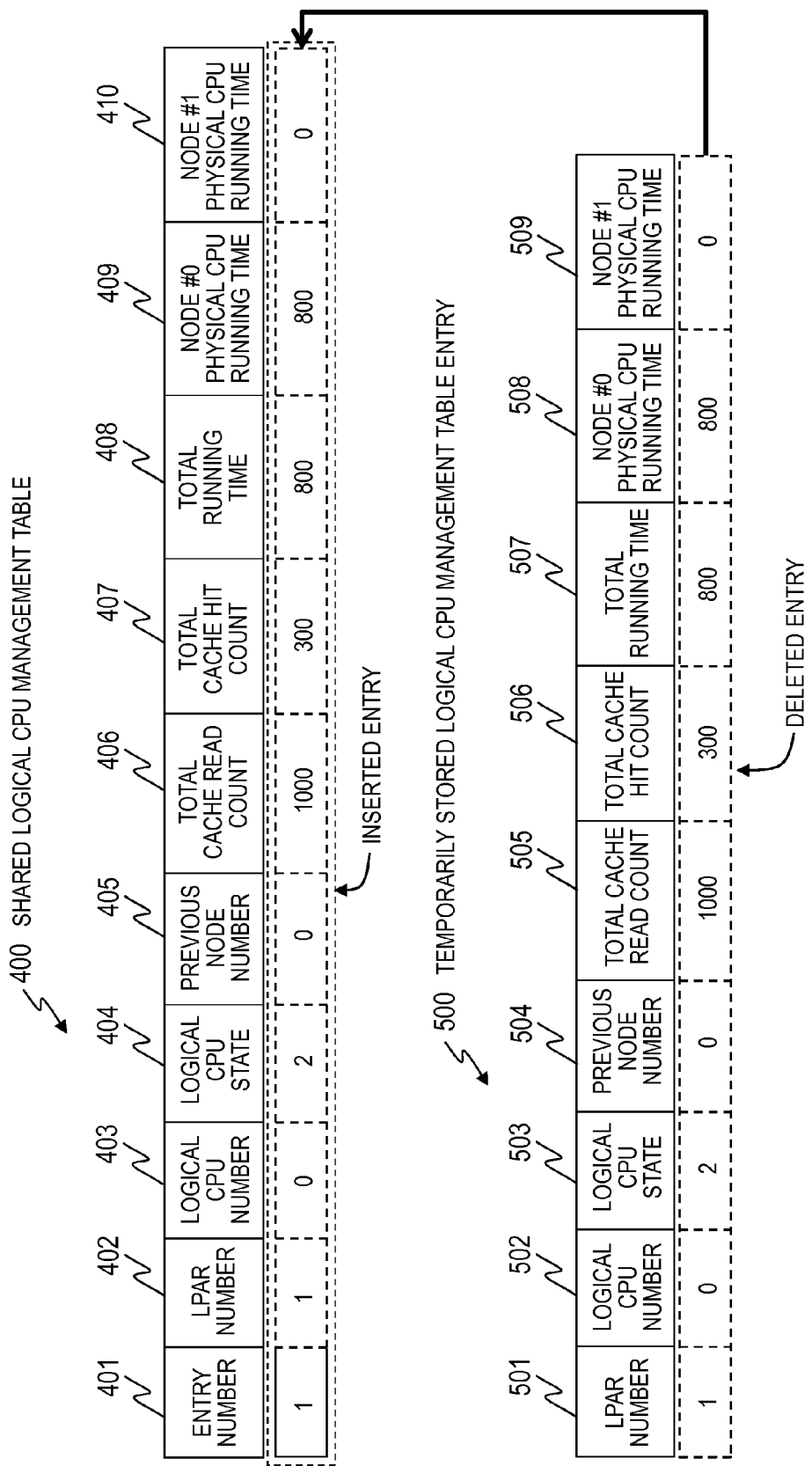
FIG. 21C is a diagram for showing a relation that is formed between the temporarily stored logical CPU management table entry and the shared logical CPU management table 400 in the first embodiment of this invention.

The result of subsequently executing the processing of FIG. 20A, FIG. 20B, and FIG. 20C after the state of FIG. 17A and FIG. 17B is reached is shown in FIG. 21A, FIG. 21B, and FIG. 21C. In this case, the running start time 604 of the logical CPU 811 is "200" as described above, and the running end time of the logical CPU 811 is "1000". The ending factor of the logical CPU 811 is a timer interrupt, and the cache read count and cache hit count of the physical CPU 4 that have been counted for the duration of the running of the logical CPU 811 are "1000" and "300", respectively. Shown in FIG. 21A to FIG. 21C is the result of executing Steps 1061 to 1068 of FIG. 20A. FIG. 21A is a diagram for showing how the temporarily stored logical CPU management table entry 500 looks after the processing of FIG. 20A, which is a part of the physical CPU dispatch ending processing, is executed. FIG. 21B is a diagram for showing how the temporary calculation table 600 looks after the processing of FIG. 20A, which is a part of the physical CPU dispatch ending processing, is executed. FIG. 21C is a diagram for showing a relation that the temporarily stored logical CPU management table entry 500 and the shared logical CPU management table 400 have after the processing of FIG. 20B and FIG. 20C is executed.

Because the ending factor of the logical CPU 811 is a timer interrupt, in Step 1062 of FIG. 20A, as shown in FIG. 21A, the scheduling function 24 changes the logical CPU state 503 of the temporarily stored logical CPU management table entry 500 from a value indicating "run" to a value "2", which indicates "ready".

The cache read count and cache hit count of the physical CPU 4 that have been counted for the duration of the running of the logical CPU 811 are "1000" and "300", respectively. In Step 1066 of FIG. 20A, the scheduling function 24 therefore writes "1000" as the cache read count 602 and "300" as the cache hit count 603 in the temporary calculation table 600 of FIG. 21B. The scheduling function 24 also adds "1000" to the total cache read count 505 and adds "300" to the total cache hit count 506 in the temporarily stored logical CPU management table entry 500 of FIG. 21A.

The running end time of the logical CPU 811 is "1000" and the physical CPU 4 belongs to the node #0. Accordingly, in Step 1067 of FIG. 20A, the scheduling function 24 therefore writes "1000" as the running end time 605 in the temporary calculation table 600 of FIG. 21B, computes a difference 800 between the running end time 605 and the running start time 604, and adds the difference 800 to the total running time 507 and to the node #0 physical CPU running time 508, which indicates how long the logical CPU 811 has been run by the physical CPU 4 belonging to the node #0, in the temporarily stored logical CPU management table entry 500 of FIG. 21A.

In Step 1068 of FIG. 20A, the scheduling function 24 divides "300", which is the total cache hit count 506, by "1000", which is the total cache read count 505, in the temporarily stored logical CPU management table entry 500 of FIG. 21A, and writes the quotient "0.3" as the total cache hit ratio 601 in the temporary calculation table 600 of FIG. 21B.

FIG. 21C is a diagram for showing a relation that is formed between the temporarily stored logical CPU management table entry 500 and the shared logical CPU management table 400 as a result of executing the processing of FIG. 20B and FIG. 20C.

As shown in FIG. 9, the monitoring enabling flag 705 is "0" in an entry created for the logical CPU #0 (811) of the LPAR #1 (801) in the threshold management table 700. Accordingly, Step 1073 of FIG. 20B is not executed and the threshold management table 700 is not updated.

The threshold β 704 is "2000" in the entry of the threshold management table 700 for the logical CPU #0 (811) of the LPAR #1 (801), and is greater than the total running time 507 in the temporarily stored logical CPU management table entry 500 of FIG. 21A, which is "800". The scheduling function 24 therefore proceeds from Step 1074 of FIG. 20B to Step 1084 of FIG. 20C.

The shared logical CPU management table 400 has no entries at this point. In Step 1084 of FIG. 20C, an entry having "1" as the entry number 401 is therefore inserted to the shared logical CPU management table 400 of FIG. 21C, and values registered in the temporarily stored logical CPU management table entry 500 of FIG. 21C are set as other items of the inserted entry.

The scheduling processing has now been described.

Figure 22:
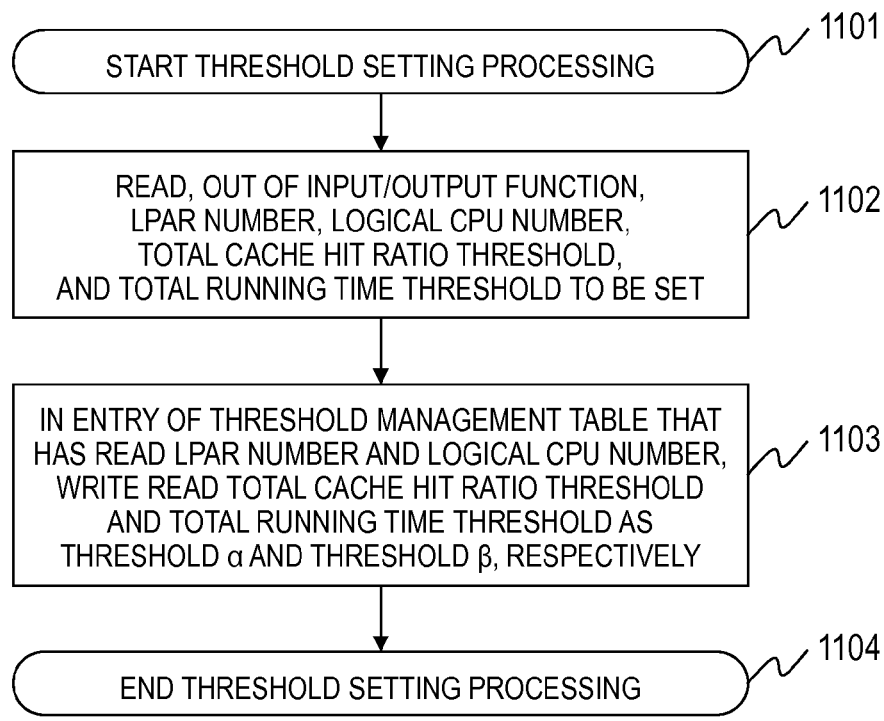
FIG. 22 is a flow chart for illustrating an example of threshold setting processing in which a threshold is stored in the threshold management table in the first embodiment of this invention.

FIG. 22 is a flow chart for illustrating an example of threshold setting processing in which a threshold is stored in the threshold management table 700. The threshold setting processing of FIG. 22 is executed by the LPAR management function 22 when the user inputs a command for setting a total cache hit ratio threshold and a total running time threshold to the hypervisor 20 via the input/output apparatus 13 and the input/output function 21.

The LPAR management function 22 reads out of the input/output function 21 an LPAR number, a logical CPU number, a total cache hit ratio threshold, and a total running time threshold that are relevant to the threshold setting (1102).

The LPAR management function 22 writes the read total cache hit ratio threshold and total running time threshold as the threshold α 703 and the threshold β 704, respectively, in an entry of the threshold management table 700 that has the LPAR number and logical CPU number read in Step 1102 (1103).

The threshold management table 700 is set through the processing described above.

Figure 23:
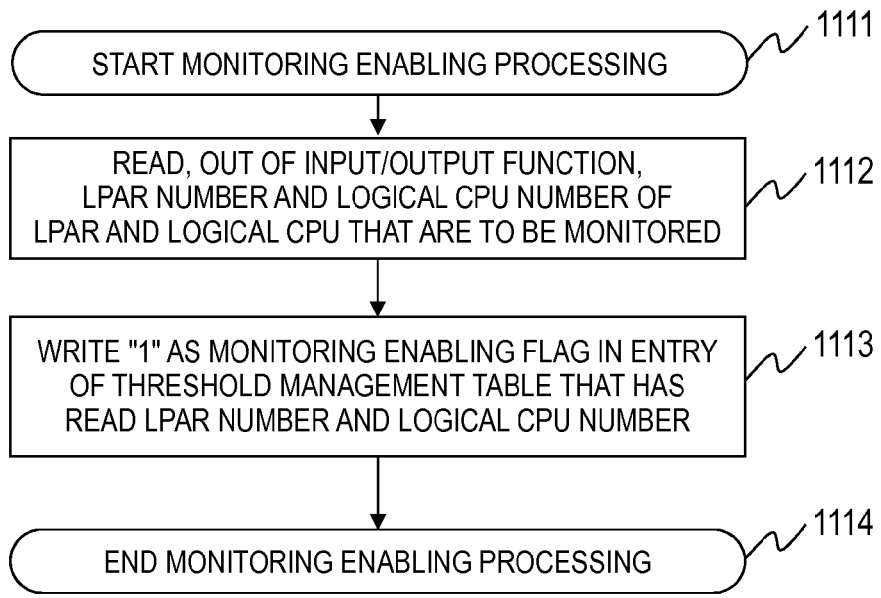
FIG. 23 is a flow chart for illustrating an example of monitoring enabling processing, which is executed to measure the cache hit ratio and the like of a logical CPU in the first embodiment of this invention.

FIG. 23 is a flow chart for illustrating an example of monitoring enabling processing, which is executed to measure the cache hit ratio and the like of a logical CPU. The monitoring enabling processing of FIG. 23 is executed by the monitoring function 25 when the user inputs a monitoring enabling command to the hypervisor 20 via the input/output apparatus 13 and the input/output function 21.

The monitoring function 25 reads out of the input/output function 21 the LPAR number and logical CPU number of an LPAR and a logical CPU that are to be monitored (1112).

The monitoring function 25 writes "1" as the monitoring enabling flag 705 in an entry of the threshold management table 700 that has the LPAR number and logical CPU number read in Step 1112 (1113).

Figure 24:
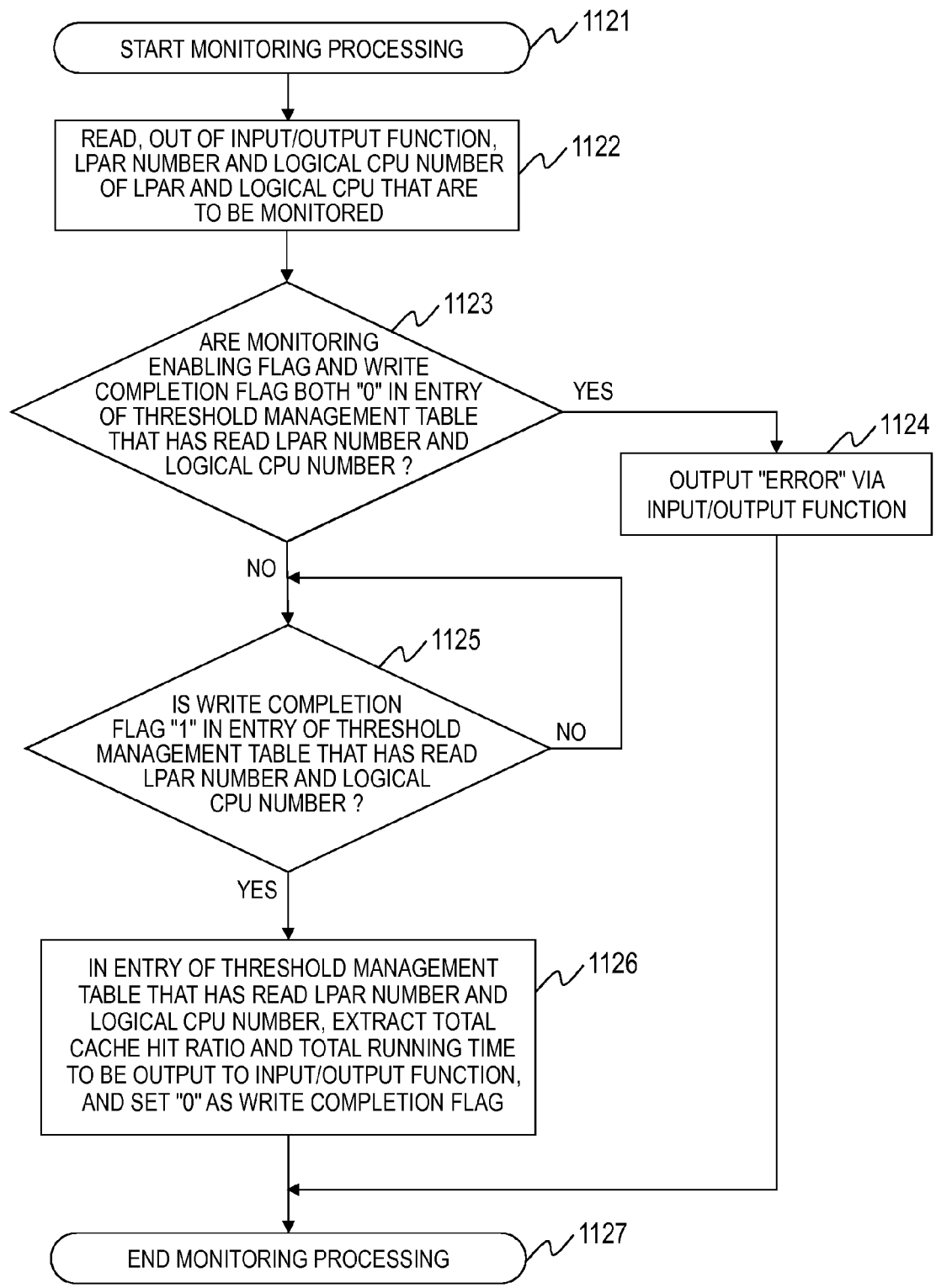
FIG. 24 is a flow chart for illustrating an example of monitoring processing, which is executed to measure the cache hit ratio of a logical CPU in the first embodiment of this invention.

FIG. 24 is a flow chart for illustrating an example of monitoring processing, which is executed to measure the cache hit ratio of a logical CPU. The monitoring processing of FIG. 24 is executed by the monitoring function 25 when the user inputs a monitoring executing command to the hypervisor 20 via the input/output apparatus 13 and the input/output function 21.

The monitoring function 25 reads out of the input/output function 21 the LPAR number and logical CPU number of an LPAR and a logical CPU that are to be monitored (1112).

The monitoring function 25 determines whether or not the monitoring enabling flag 705 and the write completion flag 706 are both "0" in an entry of the threshold management table 700 that has the LPAR number and logical CPU number read in Step 1122 (1123). When the flags are both "0", the monitoring function 25 proceeds to Step 1124 and outputs "error" via the input/output function 21.

When at least one of the monitoring enabling flag 705 and the write completion flag 706 is not "0", the monitoring function 25 proceeds to Step 1125.

The monitoring function 25 determines whether or not the write completion flag 706 is "1" in the entry of the threshold management table 700 that has the read LPAR number and logical CPU number, and waits until the write completion flag 706 changes to "1" (1125).

When the write completion flag 706 changes to "1" in Step 1125, the monitoring function 25 outputs, via the input/output function 21, the total cache hit ratio 707 and total running time 708 of the entry of the threshold management table 700 that has the LPAR number and logical CPU number, and sets the write completion flag 706 of this entry to "0" (1126).

The monitoring enabling processing of FIG. 23 and the monitoring processing of FIG. 24 enable the user to obtain the total cache hit ratio and total running time of a logical CPU of the user's choice.

FIG. 25A, FIG. 25B, and FIG. 25C are diagrams for showing transitions that occur in the threshold management table 700 in a period between the issuing of a monitoring enabling command and a monitoring executing command from the user with respect to the logical CPU #0 (811) of the LPAR #1 (801) and the completion of the monitoring processing.

FIG. 25A is a diagram for showing how the threshold management table 700 looks after the monitoring enabling processing of FIG. 23 is executed. FIG. 25B is a diagram for showing how the threshold management table 700 looks after the physical CPU dispatch ending processing of FIG. 20A to FIG. 20C is executed.

FIG. 25C is a diagram for showing how the threshold management table 700 looks after the monitoring processing of FIG. 24 is executed.

In a period between the enabling of monitoring and the completion of the monitoring processing, the total cache hit ratio and total running time of the logical CPU #0 (811) of the LPAR #1 (801) are 0.4 and 500, respectively. The reason for the transitions in FIG. 25A to FIG. 25C is described below.

FIG. 25A is the result of executing Step 1113 of the monitoring enabling processing of FIG. 23 in which the monitoring enabling flag 705 is updated to "1" in an entry of the threshold management table 700 where the LPAR number 701 is "1" and the logical CPU number 702 is "0".

FIG. 25B is the result of executing Step 1073 of FIG. 20B, which is a part of the physical CPU dispatch ending processing 974 of the scheduling processing. As a result of Step 1073, the total cache hit ratio 707, the total running time 708, the write completion flag 706, and the monitoring enabling flag 705 are updated to "0.4", "500", "1", and "0", respectively, in the entry of the threshold management table 700 where the LPAR number 701 is "1" and the logical CPU number 702 is "0".

FIG. 25C is the result of executing Step 1126 of the monitoring processing of FIG. 24 in which the monitoring function 25 outputs to the input/output function 21 the total cache hit ratio 707 and total running time 708 of the entry of the threshold management table 700 where the LPAR number 701 is "1" and the logical CPU number 702 is "0", and then updates the write completion flag 706 of this entry to "0".

By executing the threshold setting processing of FIG. 22 for each logical CPU, the user gives permission to run the logical CPU continuously with physical CPUs of one same node until the time when a given expected cache hit ratio is reached, namely, the threshold β is reached. After the total running time of the logical CPU exceeds the threshold β, which of the physical CPUs 4 to 7 is to be allocated the logical CPU 811 (812) can be controlled depending on whether or not the cache hit ratio has reached the threshold α.

The specifics of the control are outlined as follows:

In the case where the total cache hit ratio has reached the threshold α, it means that the logical CPU 811 (812) is being benefited from the cache memory 8 (9), and continuing to run the logical CPU 811 (812) by a physical CPU of the same node out of the physical CPUs 4 to 7 is allowed. The hypervisor 20 accordingly does not wake up a physical CPU in a halt state that belongs to another node, and uses one of currently awake physical CPUs to run the logical CPU 811 (812).

In the case where the total cache hit ratio has not reached the threshold α, on the other hand, the hypervisor 20 determines that processing executed in the logical CPU 811 (812) is not being benefited from the cache memory 8 or 9, and checks whether or not a physical CPU that is in a halt state and that belongs to another node is found among the physical CPUs 4 to 7. The hypervisor 20 wakes up the physical CPU in a halt state and allocates the logical CPU 811 (812) to the physical CPU so that the logical CPU 811 (812) is run by the physical CPU. In this manner, when the memory access performance is measured for a period that exceeds the threshold β, the cost of accessing the physical memory 10 from the logical CPU 811 (812) and the cost of accessing the physical memory 11 from the logical CPU 811 (812) can be varied from each other so that the costs of accessing the physical memories 10 and 11 settle at an intermediate value between the largest value and the smallest value.

The monitoring enabling processing (FIG. 23) and monitoring processing (FIG. 24) of the monitoring function 25 are functions that contribute to the setting of the threshold α and the threshold β. These functions enable the user to find out the continuous running time of each logical CPU, which lasts until a given cache hit ratio is reached.

Figure 26:
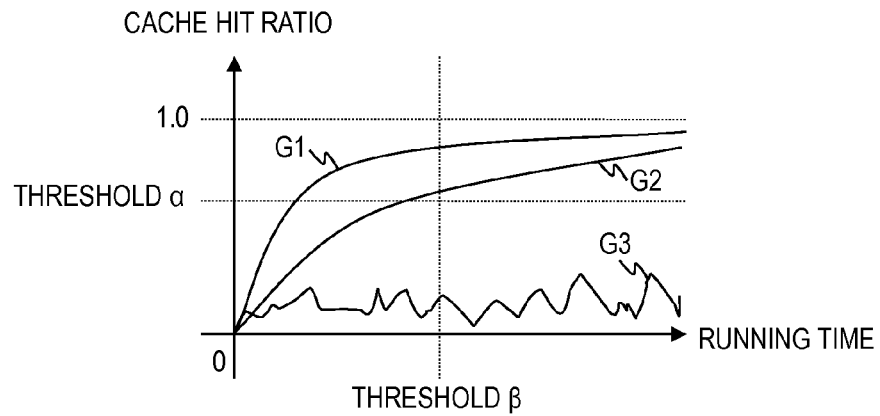
FIG. 26 is a graph for showing a relation between the running time and the cache hit ratio in a logical CPU in the first embodiment of this invention.

As an example, a logical CPU is run continuously by physical CPUs of one same node while executing the monitoring enabling processing and the monitoring processing alternatingly and repeatedly, and a relation between the running time and the cache hit ratio that is observed in this case is shown in FIG. 26.

FIG. 26 is a graph for showing a relation between the running time and the cache hit ratio in a logical CPU. In FIG. 26, a graph G1 represents a relation between the running time and the cache hit ratio in a logical CPU where the cache hit ratio characteristically rises in a short period of time. A graph G2 represents a relation between the running time and the cache hit ratio in a logical CPU where the cache hit ratio characteristically rises gradually. A graph G3 represents a relation between the running time and the cache hit ratio in a logical CPU where the cache hit ratio characteristically fluctuates at a low level instead of rising.

The cache hit ratio in the graph G1 rises in a shorter period of time than in the graph G2 or the graph G3. A possible cause of the relation being as represented by the graph G1 is that the high cache hit ratio after the running time exceeds the threshold β makes a memory amount used by a program that is processed by the logical CPU smaller than the capacity of the cache memory 8 or 9.

The rise of the cache hit ratio in the graph G2 is slower than in the graph G1. A possible cause of the relation being as represented by the graph G2 is that the gradual rise in cache hit ratio as a result of a large quantity of data write in the cache memory 8 or 9 has made a memory amount that is used by the program approximately equal to the cache capacity.

The cache hit ratio in the graph G3 does not rise and fluctuates at a level that is lower than in the graph G1 or the graph G2. A possible cause of the relation being as represented by the graph G3 is that writing in the cache memory 8 or 9 does not increase cache hits, thereby making the memory amount that is used by the program larger than the cache capacity.

As described above, while the time required for the cache hit ratio to rise to the given threshold α varies depending on what program is processed by the logical CPU 811 or 812, the monitoring function 25 enables the user to obtain a relation between the cache hit ratio and the continuous running time of the logical CPU 811 or 812, such as those represented by the graphs G1 to G3, and to further find out the time required till a given cache hit ratio is reached.

In the case where this result is to be used in processing a program that is small in consumed memory amount as in the graph G1 and a program that is large in consumed memory amount as in the graph G3 by one logical CPU 811 (812), for example, the threshold α of the graph G1 is set to a value larger than 0.5, which is exactly the middle in the access count ratio of the number of times the cache memory 8 (9) is accessed and the number of times the physical memory 10 (11) is accessed. The running time of the logical CPU 811 (812) until the cache hit ratio reaches the threshold α is then set as the threshold β by the threshold setting processing described above. The number of times the physical memory 10 (11) is accessed is the cache miss count of the logical CPU 811 (812).

In this way, the logical CPU 811 (812) run by physical CPUs that belong to the same node out of the physical CPUs 4 to 7 until the time when the threshold β is reached has a cache hit ratio higher than the threshold α when processing the program that is small in consumed memory amount and therefore readily benefits from the cache memory 8 (9), and has a cache hit ratio lower than the threshold α when processing the program that is large in consumed memory amount and can therefore vary the cost of accessing the physical memory 10 from the logical CPU 811 (812) and the cost of accessing the physical memory 11 from the logical CPU 811 (812) from each other so that the costs of accessing the physical memories 10 and 11 settle at an intermediate value between the largest value and the smallest value.

This also makes it possible to tuning the threshold α and the threshold β in real time in order to improve the memory access performance of the logical CPU 811 (812) by using the monitoring function 25 to determine whether or not the given cache hit ratio has been reached and feeding the cache hit ratio back to the input/output apparatus 13 through the threshold setting processing of the LPAR management function 22.

As described above, in the virtual computer system of this embodiment, which includes a large number of physical CPUs (or cores), here, the physical CPUs 4 to 7, when a physical CPU in a sleep state is found among the physical CPUs 4 to 7 and the cache hit ratio of the logical CPU 811 (812) is higher than the threshold α, the running of the logical CPU 811 (812) is resumed by one of the physical CPUs 4 to 7 that belongs to the same node as the physical CPU that has previously run the logical CPU 811 (812) so that the logical CPU 811 (812) readily benefits from the cache memory 8 (9). When the cache hit ratio is low, on the other hand, the right to access the physical memory 10 (11) is moved from a physical CPU of one node to a physical CPU of another node, with the result that the cost of accessing the physical memory 10 (11) from the logical CPU 811 (812) settles at an intermediate value between the largest value and the smallest value.

Figure 27:
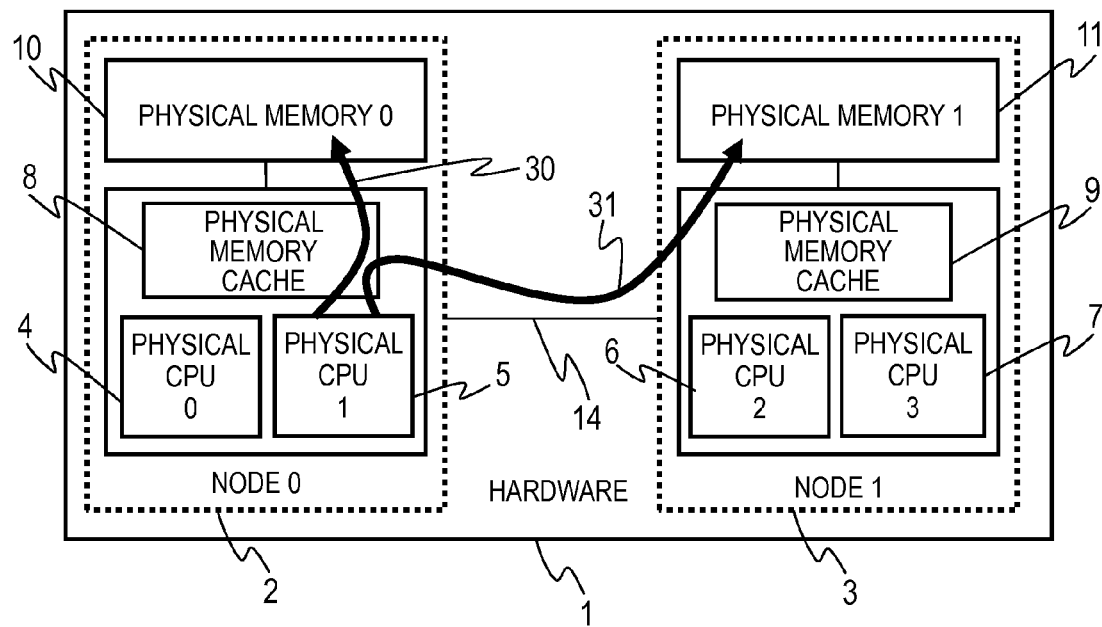
FIG. 27 is a block diagram for illustrating the configuration of the hardware (virtual computer) that has the NUMA configuration where a memory is accessed.

An example of memory access according to related art is described next with reference to FIG. 27 and FIG. 28. FIG. 27 is a block diagram for illustrating the configuration of the hardware (virtual computer) 1 that has the NUMA configuration where the memory access cost varies depending on from where a memory is accessed. In this example, access (31) from the physical CPU #1 (5) to the physical memory #1 (11) of the node #1 (3), which is separate from the node #0 (2) of the physical CPU #1 (5), is made via the interconnect 14, which couples the node #0 (2) and the node #1 (3), and the cost of the access (31) is therefore larger than the cost of access (30) from the physical CPU #1 (5) to the physical memory #0 (10) of the node #0 (2) to which the physical CPU #1 (5) belongs. A hypervisor of related art (not shown) runs on the hardware 1.

In the case where the physical CPUs 4 to 7 share, by time division, logical CPUs of a plurality of LPARs, here, the logical CPUs 811 and 812 of the LPARs 801 and 802, in related art, when the number of physical CPUs (here, the physical CPUs 4 to 7: four in total) is enough, the logical CPUs are run only by physical CPUs that are awake, instead of waking up a physical CPU that is in a sleep state. An example of this is illustrated in FIG. 28.

Figure 28:
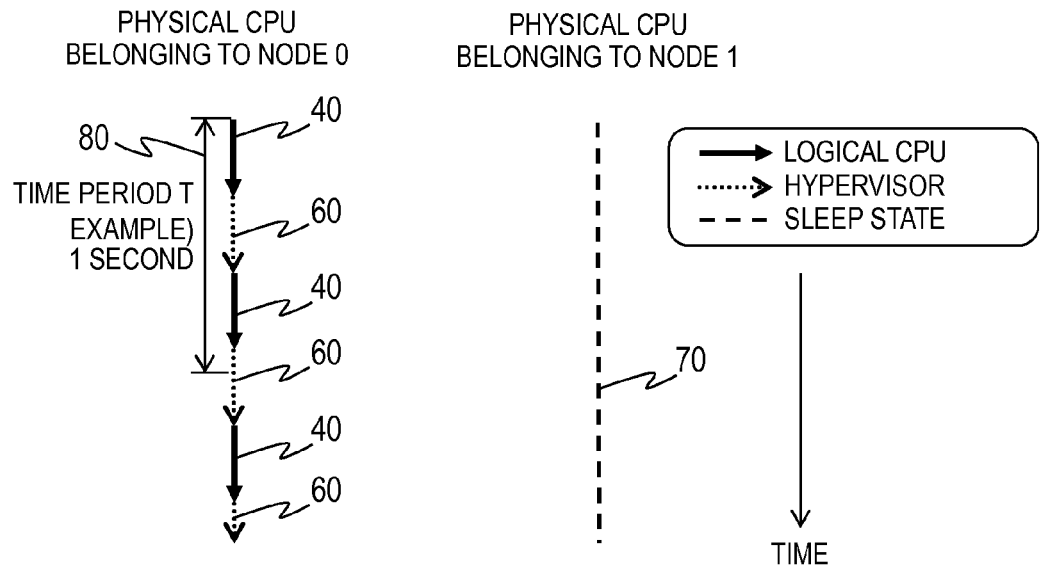
FIG. 28 is an example of a time chart of a logical CPU that is run by a physical CPU belonging to the node #0 in the first embodiment of this invention.

Illustrated in FIG. 28 is a time series of a logical CPU (the solid line) that is run by a physical CPU belonging to the node #0 and a physical CPU belonging to the node #1, and of the hypervisor (the dotted line). Time progresses downward in FIG. 28. An arrow 40 represents a time required for processing of the logical CPU, a broken line arrow 60 represents a time required for processing of the hypervisor, a broken line 70 represents a time period in which the physical CPU is in a sleep state, and a time period T in which an average value of the memory access performance is measured is denoted by 80. The length of the arrow 40, which represents processing of the logical CPU, is, at maximum, a unit time called a time slice, which is defined in advance in the hypervisor. The time slice is in general set to several tens milliseconds or so.

In FIG. 28, only one logical CPU is running on a physical computer, and a physical CPU that belongs to the node #0 has started executing processing of the logical CPU. The logical CPU running 40 subsequently ends and the scheduling processing 60 of the hypervisor takes over to select a physical CPU by which the running of the logical CPU is to be resumed. Every physical CPU that belongs to the node #1 is in the sleep state 70, and the logical CPU is therefore allocated to a physical CPU that belongs to the node #0, where the logical CPU has previously been run, so that the running of the logical CPU is resumed by this physical CPU. In this manner, the processing in which a logical CPU is kept allocated to physical CPUs that belong to the node #0 through the scheduling processing of the hypervisor is repeated unless a physical CPU that belongs to the node #1 wakes up.

A case where a logical CPU of an LPAR is allocated to the physical CPU #1 (5) and a program of the logical CPU executes processing that involves the memory access 31 in FIG. 28 is considered. For the duration of the time period T, for example, 1 second, which is a common temporal unit of memory measurement, the logical CPU is run only by physical CPUs that belong to the node #0, and the memory access 31 from the logical CPU is therefore always remote access. This means that the average memory access performance in the time period T is the access performance of remote memory access, namely, low performance.

However, the influence of the NUMA configuration on the access performance of access to a physical memory is lost in this case also if a memory amount used by the program of the logical CPU is within the capacity of a physical cache memory and data in a memory that is used by the program is stored in the cache so that accessing the cache memory is enough to use the data. In other words, because simply switching the allocation of the logical CPU from one physical CPU to another in a short period of time does not bring out the benefit of the cache memory much, the computer system should be designed so as to benefit from the cache as well when the content ratio of data and commands to be accessed in the cache, namely, the cache hit ratio, remains high.

In this invention, when a logical CPU is run continuously by physical CPUs of one same node, the hypervisor 20 determines whether or not the continuous running time of the logical CPU has exceeded the time period β till a given cache hit ratio is reached and, in the case where the time period β has been exceeded, determines whether or not the cache hit ratio of the logical CPU has reached the threshold α.

In the case where the cache hit ratio is less than the threshold α, the hypervisor 20 determines that the logical CPU is not benefiting from the cache memory 8 or 9, checks whether a physical CPU in a sleep state is found in a node that is not the one where the logical CPU has been run continuously, and wakes up the found physical CPU in order to run the logical CPU with this physical CPU.

In the case where the cache hit ratio is high (has reached the threshold α), on the other hand, the hypervisor 20 does not wake up a physical CPU that is in a sleep state and belongs to a different node from the one where the logical CPU has been run continuously, and instead causes a currently awake physical CPU to resume the running of the logical CPU. In the case where the cache hit ratio is low but a physical CPU in a sleep state is not found in a node that is not the one where the logical CPU has been run continuously, the hypervisor 20 also causes a currently awake physical CPU to resume the running of the logical CPU.

A logical CPU to be run is held in the logical CPU queue of the hypervisor 20, is run by a physical CPU in an order in which the logical CPU has been put in the queue. After the running of the logical CPU in a given cycle (e.g., the cycle of time division) is finished, the hypervisor 20 puts the logical CPU back in the logical CPU queue.

The total running time threshold β is set to a value smaller than the time period T in which an average value of the memory performance is measured. The reason thereof is described above.

Figure 29:
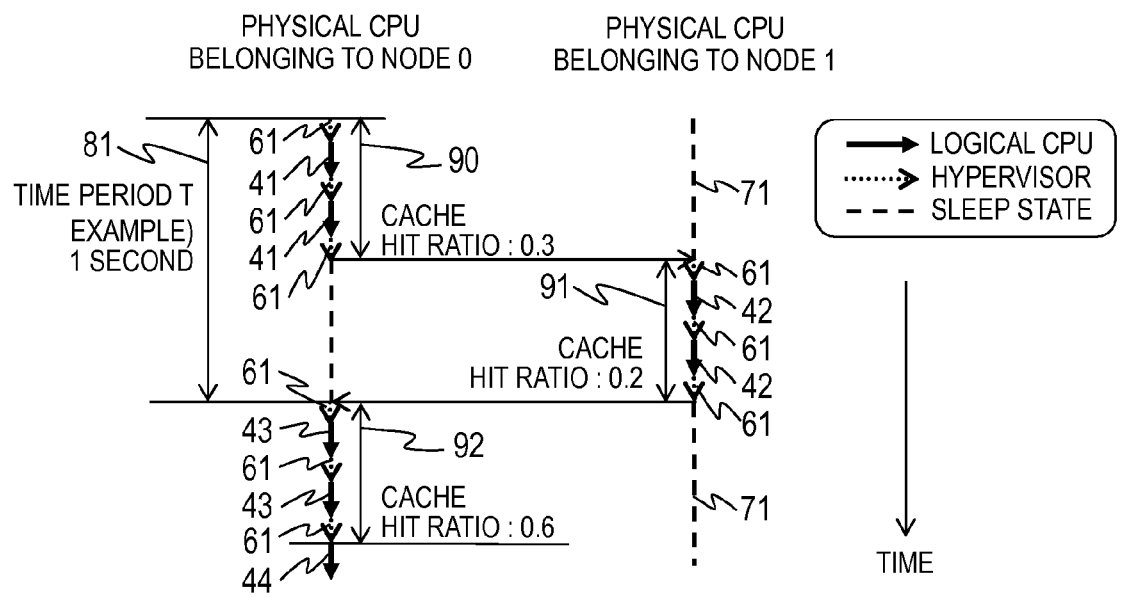
FIG. 29 is an example of a time chart of a logical CPU that is run by a physical CPU of one node and a physical CPU of another node out of the physical CPUs in the first embodiment of this invention.

Illustrated in FIG. 29 is an example of a time series of a logical CPU that is run by a physical CPU of one node and a physical CPU of another node out of the physical CPUs 4 to 7, and of the hypervisor, when the total cache hit ratio threshold α is 0.5 and the total running time threshold β is equal to two time slices of the logical CPU in this invention. In this example, time progresses downward in FIG. 29 as in FIG. 28. Arrows 41 to 44 each represent a time required for processing of the logical CPU (for example, 811), a broken line arrow 61 represents a time required for processing of the hypervisor 20, a broken line 71 represents a time period in which the physical CPU is in a sleep state, and a time period T in which an average value of the memory access performance is measured is denoted by 81.

Only one logical CPU is run in FIG. 29. Accordingly, the one logical CPU, here, the logical CPU 811, alone is put in and out of the logical CPU queue of the hypervisor 20. When the running of the logical CPU 811 is finished, the logical CPU 811 is put back in the logical CPU queue and, when the next logical CPU is selected, the logical CPU 811 is taken out of the logical CPU queue.

In a period 90 to a period 92, in which the total running time threshold β has not been exceeded, the hypervisor 20 determines that the cache hit ratio of the logical CPU 811 has not reached the threshold α, and selects an awake physical CPU, if possible, as a physical CPU that runs the logical CPU 811, instead of waking up a physical CPU in a sleep state that belongs to another node, namely, the node #1.

When the total running time threshold β is exceeded for the first time, namely, immediately after the period 90, the cache hit ratio of the logical CPU 811 is "0.3". With the cache hit ratio of the logical CPU 811 less than the threshold α, the hypervisor 20 in this case determines that the logical CPU 811 is not benefiting from the cache memory 8 or 9, wakes up a physical CPU that belongs to the node #1, and runs the logical CPU 811 with the physical CPU belonging to the node #1.

Immediately after the period 91, in which the total running time threshold β is exceeded for the second time, the cache hit ratio of the logical CPU 811 is "0.2". As in the period 90, in which the total running time threshold β is exceeded for the first time, the hypervisor 20 in this case determines that the logical CPU 811 is not benefiting from the cache memory 8 or 9, wakes up a physical CPU that belongs to the node #0, and resumes the running of the logical CPU 811 with the physical CPU belonging to the node #0.

When the total running time threshold β is exceeded for the third time, namely, immediately after the period 92, the cache hit ratio of the logical CPU 811 is equal to or more than the total cache hit ratio threshold α at "0.6". Then the hypervisor 20 determines that the logical CPU 811 is benefiting from the cache, and allows a physical CPU that belongs to the node #0 to keep running the logical CPU 811 (44), instead of waking up a physical CPU that belongs to the node #1.

To discuss this example in terms of the time period T, access from the logical CPU 811 to the physical memories 10 and 11 is considered as frequent immediately after the period 90 and the period 91, in which the cache hit ratio is less than the total cache hit ratio threshold α. In the time period T, the sum of the logical CPU running times 41 and the sum of the logical CPU running times 42 are each a length of time that is equal to or more than the total running time threshold β. This means that, during the time period T, the logical CPU 811 is run by physical CPUs that belong to the node #0 for a length of time equivalent to the total running time threshold β and by physical CPUs that belong to the node #1 for the same length of time.

Figure 30:
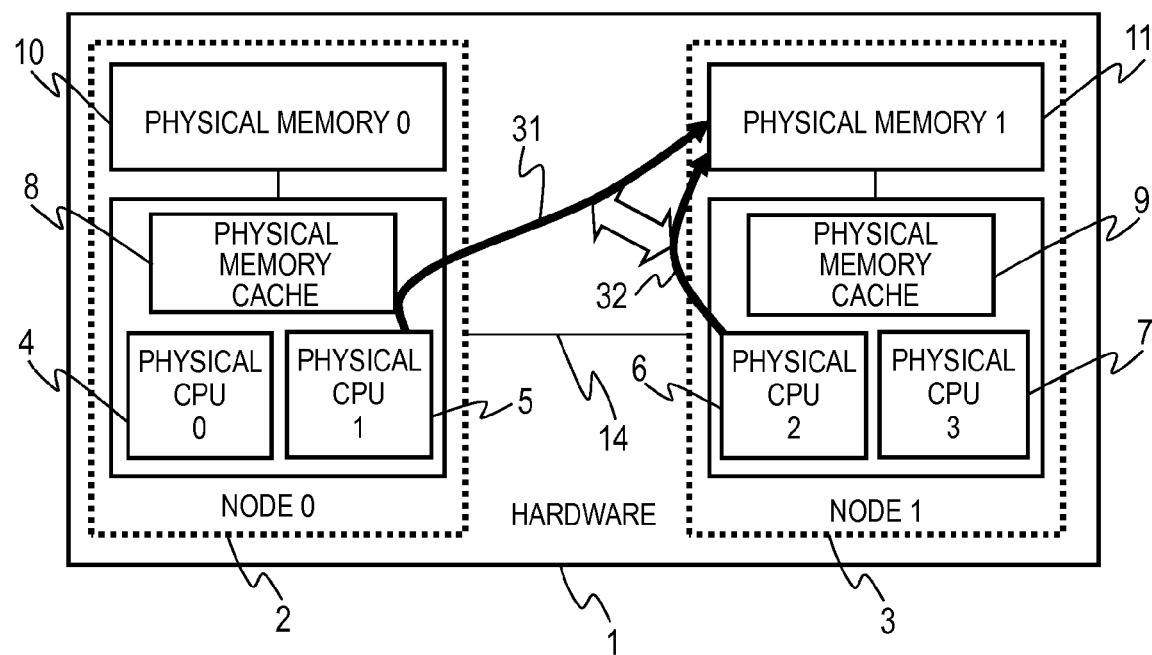
FIG. 30 is a block diagram for illustrating the configuration of the hardware (virtual computer) that has the NUMA configuration.

FIG. 30 is a diagram of the hardware of FIG. 27 in which a physical CPU of FIG. 29 that belongs to the node #0 is the physical CPU #1 (5), a physical CPU of FIG. 29 that belongs to the node #1 is the physical CPU #2 (6), and the logical CPU of FIG. 29 continues memory access to the physical memory #1 (11). In this case, where the total logical CPU running time of the physical CPU #1 (5), which belongs to the node #0, is the same as the total logical CPU running time of the physical CPU #2 (6), which belongs to the node #1, the length of the memory access 31 is approximately the same as the length of the memory access 32. An average physical memory access cost of the logical CPU of FIG. 20 in the time period T is therefore an intermediate value between the cost of accessing the local memory, namely, the minimum value and the cost of accessing the remote memory, namely, the maximum value.

According to this invention, in a virtual computer having the NUMA configuration or similar hardware configurations where the memory access performance (latency) varies depending on from where a memory is accessed, at least intermediate memory access performance between the highest performance and the lowest performance can be obtained when the number of logical CPUs is enough in relation to the number of physical CPUs and the physical memory access performance of logical CPUs is observed for the time period T, which is 1 second or so. An additional effect in that the cache memories 8 and 9 make the memory read/write performance high is obtained when the cache hit ratio is equal to or more than the threshold α.

Figure 31:
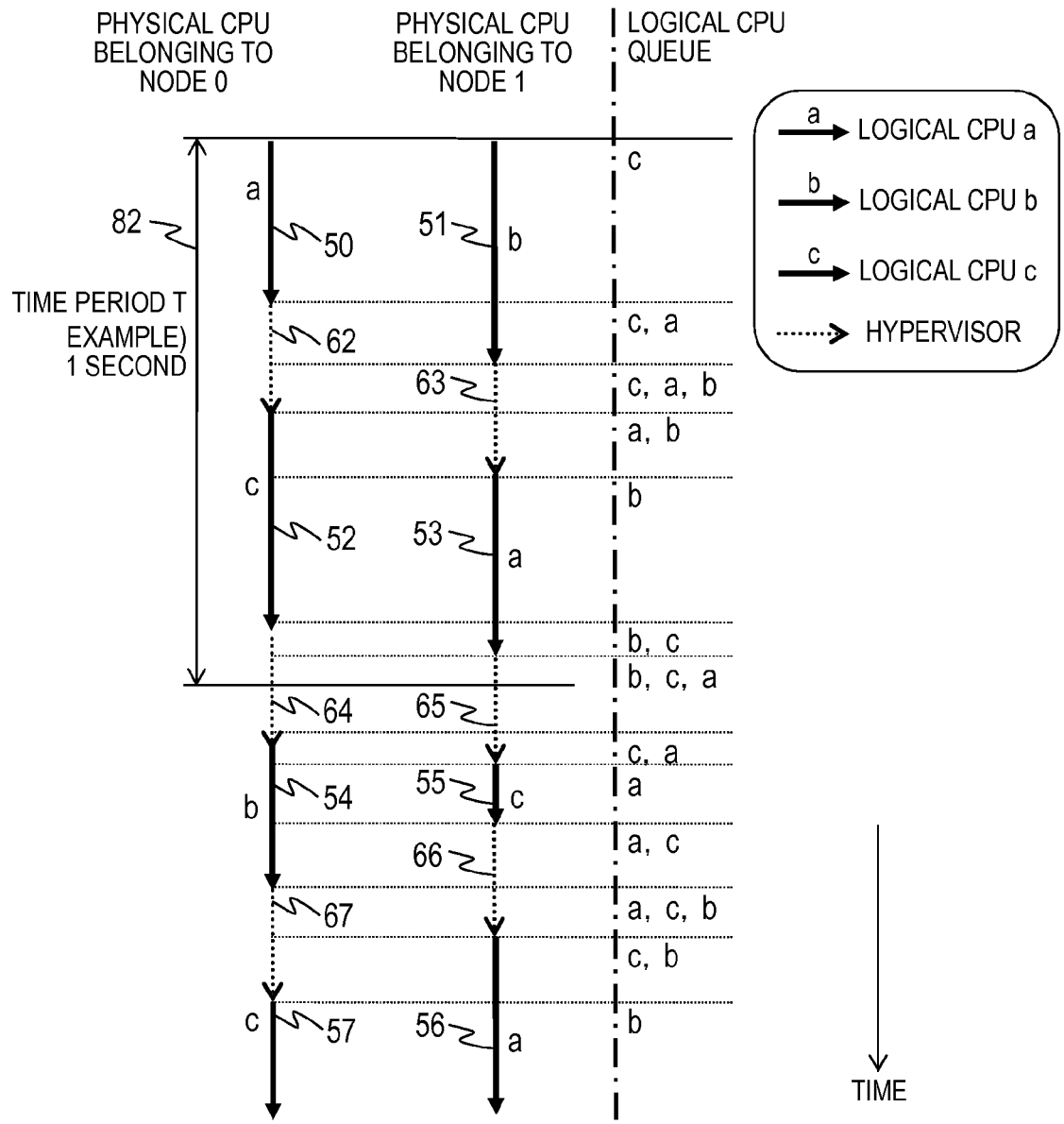
FIG. 31 is a block diagram for illustrating the configuration of the hardware that has the NUMA configuration.

Illustrated in FIG. 31 is a case where the virtual computer system of this invention is busy when no physical CPU is in a sleep state. FIG. 31 is a time series diagram of processing that is executed by logical CPUs run by physical CPUs of the nodes #0 and #1, and of processing that is executed by the hypervisor, and time progresses downward in FIG. 31 as in FIG. 28.

In FIG. 31, three logical CPUs, a logical CPU a, a logical CPU b, and a logical CPU c, are run. Arrows 50, 53, and 56 each represent a time required for processing of the logical CPU a, arrows 51 and 54 each represent a time required for processing of the logical CPU b, and arrows 52, 55, and 57 each represent a time required for processing of the logical CPU c. Broken line arrows 62 to 67 each represent a time required for processing of the hypervisor 20, and a time period T in which an average value of the memory access performance is measured is denoted by 82. How the logical CPUs are queued in the logical CPU queue when the logical CPUs or the hypervisor 20 starts processing is illustrated alongside the time series. The hypervisor 20 takes a logical CPU to be run next out of the queue in order, starting from an element on the left side of the drawing. When the running of the logical CPU is finished, the logical CPU is put in the queue as an element on the right side of the drawing. For instance, at the time the logical CPU processing 51 is finished, the logical CPU c, the logical CPU a, and the logical CPU b are queued in the order stated because the processing of the logical CPU b has ended and the logical CPU b has been put in the queue on the right side of the drawing, and the logical CPU c on the left side is taken out of the queue by the hypervisor 20 as a logical CPU to be run next.

The running time of a logical CPU varies depending on what program is processed by the logical CPU, which means that the running time varies from one logical CPU to another. Consequently, when one logical CPU starts running later than another logical CPU but finishes running earlier than the other logical CPU, the order in which these logical CPUs are put in the logical CPU queue is reversed. This phenomenon applies to the processing 54 of the logical CPU b and the processing 55 of the logical CPU c in FIG. 31. Accordingly, there is some randomness to the order in which logical CPUs are put in the queue.

Because of the randomness that is at work with regards to the order in which logical CPUs are put in the queue, a random logical CPU is taken out of the queue by the hypervisor 20, with the result that the logical CPU is run by a random physical CPU.

Therefore, when the virtual computer system is busy, local memory access and remote memory access that occur at random constitutes access to the physical memories from the logical CPUs. Intermediate memory access performance between the highest performance and the lowest performance is consequently obtained when the costs of accessing the memories from the logical CPUs are observed for the time period T, which is 1 second or so.

As described above, when the running time of the logical CPU 811 (812) exceeds the threshold β in this invention, the hypervisor 20 determines which of the physical CPUs 4 to 7 is to run the logical CPU 811 (812) next based on the result of comparing the cache hit ratio of the logical CPU 811 (812) with the threshold α. When the cache hit ratio, which is performance information of the logical CPU 811 (812), is equal to or more than the threshold α, the hypervisor 20 selects out of the physical CPUs 4 to 7 a physical CPU of the same node as the one where the logical CPU 811 (812) has been run, thereby accomplishing efficient processing execution in which the logical CPU 811 (812) reads data or commands that are stored in the cache memory 8 (9).

When the cache hit ratio of the logical CPU 811 (812) is less than the threshold α, on the other hand, the hypervisor 20 selects a physical CPU of another node that is asleep out of the physical CPUs 6 and 7, and wakes up the selected physical CPU so that the logical CPU 811 (812) is run by this physical CPU. By switching the physical CPU that runs the logical CPU 811 (812) to a physical CPU in another node and then to a physical CPU in still another node sequentially when the cache hit ratio is less than the threshold α, the cost of accessing a physical memory can be prevented from remaining high.

Second Embodiment

Figure 32:
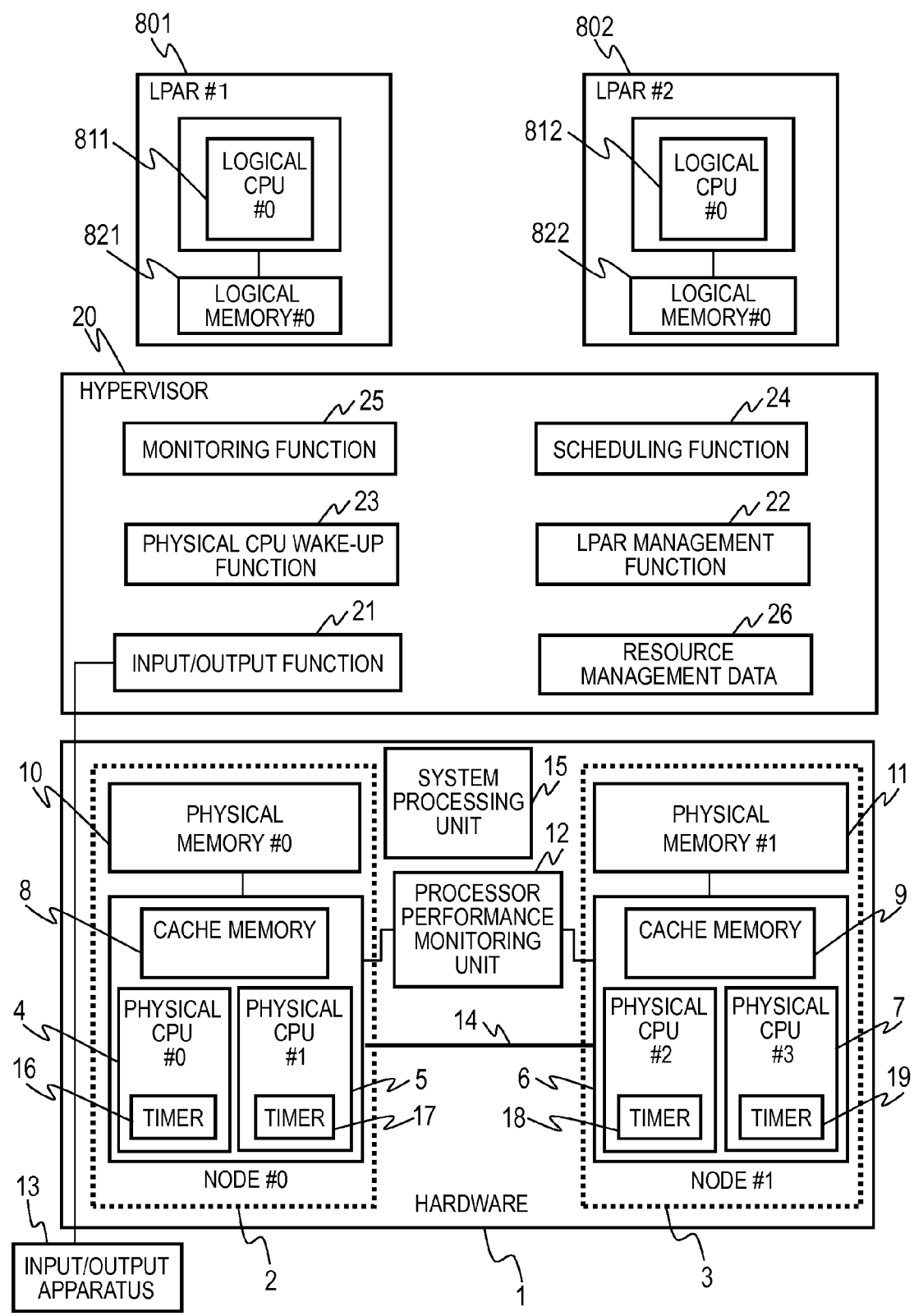
FIG. 32 is a block diagram for illustrating an example of a virtual computer system in a second embodiment of this invention.

The first embodiment, which describes an example where the monitoring function 25 measures performance information on access to the cache memories 8 and 9 from the physical CPUs 4 to 7, may be modified as illustrated in FIG. 32. As illustrated in FIG. 32, a processor performance monitoring unit 12 coupled to nodes 2 and 3 may measure performance information such as the cache read counts and cache hit counts of the physical CPUs 4 to 7, and the monitoring function 25 may compute the cache hit ratio.

The processor performance monitoring unit 12 is coupled to the node 2 and to the node 3 separately to measure information on the performance of the physical CPUs 4 to 7 (or logical CPUs).

The processor performance monitoring unit 12 includes counters (not shown) for counting the numbers of times the cache memories 8 and 9 are read by the physical CPUs 4 to 7 (or logical CPUs) (cache read counts) and counters (not shown) for counting the numbers of times there is a hit in the cache memories 8 and 9 (cache hit counts). In the example of FIG. 32, the physical CPUs 4 and 5 share the cache memory 8, the physical CPUs 6 and 7 share the cache memory 9, and the processor performance monitoring unit 12 has, for each of the physical CPUs 4 to 7, a counter for counting the cache read count of the physical CPU and a counter for counting the cache hit count of the physical CPU.

In the case where the processor performance monitoring unit 12 counts the cache read count and cache hit count of a logical CPU, whether it is a physical CPU or a logical CPU that is reading the cache memory 8 or 9 is indistinguishable to the processor performance monitoring unit 12. The hypervisor 20 therefore regards memory access past the time when the counters of the processor performance monitoring unit 12 are reset as access from a logical CPU in the measurement of the cache read count and the cache hit count.

In the embodiments described above, the length of the time slice set to the timers 16 to 19 may be the timer interrupt cycle of guest OSes (not shown) of the LPARs 801 and 802.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:
1. A virtual computer system, comprising:
a plurality of nodes each comprising physical CPUs, a cache memory, and a physical memory; and
a virtualization module for allocating computer resources of the plurality of nodes to virtual computers,
wherein the plurality of nodes are coupled to one another via an interconnect,
wherein the virtualization module comprises:
a logical partition management module for generating logical partitions and logical CPUs as the computer resources to be allocated to the virtual computers;
a scheduling module for selecting, for each of the logical CPUs, one of the physical CPUs that is to run said each of the logical CPUs; and
a monitoring module for measuring, for each of the logical CPUs, performance information indicating a cache hit ratio, wherein in a case where a time for which a logical CPU that has been run continuously by one of the physical CPUs exceeds a first threshold and the performance information reaches a second threshold, the scheduling module selects the physical CPU that is to run the logical CPU from the same node as one of the plurality of nodes to which a physical CPU that has run the logical CPU a last time belongs, and the selected physical CPU from the same node will run the logical CPU, and, in a case where the performance information falls short of the second threshold, selects the physical CPU that is to run the logical CPU from another of the plurality of nodes different from said one of the plurality of nodes to which the physical CPU that has run the logical CPU the last time belongs, and the selected physical CPU from the different node will run the logical CPU.

2. The virtual computer system according to claim 1, wherein the monitoring module obtains, for each of the logical CPUs, a cache read count and a cache hit count that are counted while said each of the logical CPUs is run, and comprises cache information for holding the cache read count and the cache hit count that are counted while one logical CPU is run continuously, and
wherein the scheduling module uses the monitoring module to update the cache information each time said each of the logical CPUs is run.

3. The virtual computer system according to claim 2,
wherein the monitoring module obtains, from the cache information, the cache read count and the cache hit count that are counted while said each of the logical CPUs is run, to calculate the cache hit ratio.

4. The virtual computer system according to claim 3, wherein the scheduling module is configured to:
measure, for each of the logical CPUs, a time for which said each of the logical CPUs has been run continuously, and store the continuous running time on a logical CPU-by-logical CPU basis in logical CPU management information.

5. The virtual computer system according to claim 4, wherein, when selecting from said another of the plurality of nodes different from the one of the plurality of nodes to which the physical CPU that has run the logical CPU the last time belongs, the scheduling module selects a physical CPU that is in a sleep state from the said another of the plurality of nodes, and wakes up the selected physical CPU so that the logical CPU is run by the woken physical CPU.

6. A scheduling method for a virtual computer system comprising: a plurality of nodes each comprising physical CPUs comprising a cache memory and physical memories; and a virtualization module for generating logical CPUs and logical partitions from computer resources of the plurality of nodes to run virtual computers, for allocating, by the virtualization module, each of the logical CPUs to one of the physical CPUs so that said each of the logical CPUs is run by the one of the physical CPUs, the plurality of nodes being coupled to one another via an interconnect, the scheduling method comprising:
selecting, by the virtualization module, for each of the logical CPUs, one of the physical CPUs that is to be allocated said each of the logical CPUs;
measuring, by the virtualization module, for each of the logical CPUs, performance information indicating a cache hit ratio; and
selecting, by the virtualization module, in a case where a time for which a logical CPU that has been run continuously by one of the physical CPUs exceeds a first threshold and the performance information reaches a second threshold, the physical CPU that is to run the logical CPU from the same node as one of the plurality of nodes to which a physical CPU that has run the logical CPU a last time belongs, and the selected physical CPU from the same node will run the logical CPU, and, in a case where the performance information falls short of the second threshold, selecting the physical CPU that is to run the logical CPU from another of the plurality of nodes different from the one of the plurality of nodes to which the physical CPU that has run the logical CPU the last time belongs, and the selected physical CPU from the different node will run the logical CPU.

7. The scheduling method according to claim 6, further including:
obtaining, for each of the logical CPUs, a cache read count and a cache hit count that are counted while said each of the logical CPUs is run, and holding, in cache information, the cache read count and the cache hit count that are counted while one logical CPU is run continuously; and
updating the cache information each time said each of the logical CPUs is run.

8. The scheduling method according to claim 7, further including:
obtaining, from the cache information, the cache read count and the cache hit count that are counted while said each of the logical CPUs is run, to calculate the cache hit ratio.

9. The scheduling method according to claim 8, further including:
measuring, for each of the logical CPUs, a time for which said each of the logical CPUs has been run continuously;
storing the continuous running time on a logical CPU-by-logical CPU basis in logical CPU management information; and
obtaining from the logical CPU management information the continuous running time of the logical CPU allocated to the physical CPU.

10. The scheduling method according to claim 9, further including:
selecting, when selecting from said another of the plurality of nodes different from the one of the plurality of nodes to which the physical CPU that has run the logical CPU the last time belongs, a physical CPU that is in a sleep state from said another of the plurality of nodes, and waking up the selected physical CPU so that the logical CPU is run by the woken physical CPU.

11. A non-transitory data storage medium comprising:
a virtualization module for allocating computer resources of a plurality of nodes to virtual computers, wherein the plurality of nodes are coupled to one another via an interconnect and each node comprises physical CPUs, a cache memory, and a physical memory,
wherein the virtualization module comprises:
a logical partition management module for generating logical partitions and logical CPUs as the computer resources to be allocated to the virtual computers;
a scheduling module for selecting, for each of the logical CPUs, one of the physical CPUs that is to run said each of the logical CPUs; and
a monitoring module for measuring, for each of the logical CPUs, performance information indicating a cache hit ratio,
wherein the scheduling module is configured to:

measure, for each of the logical CPUs, a time for which said each of the logical CPUs has been run continuously, and store the continuous running time on a logical CPU-by-logical CPU basis in logical CPU management information; and select, when the continuous running time for which the logical CPU has been run by one of the physical CPUs exceeds a first threshold and the performance information reaches a second threshold, the physical CPU that is to run the logical CPU from the same node as the one of the plurality of nodes to which a physical CPU that has run the logical CPU a last time belongs, and the selected physical CPU from the same node will run the logical CPU, and select, in a case where the performance information falls short of the second threshold, the physical CPU that is to run the logical CPU from said another of the plurality of nodes different from the one of the plurality of nodes to which the physical CPU that has run the logical CPU the last time belongs, and the selected physical CPU from the different node will run the logical CPU.

12. The non-transitory data storage medium according to claim 11, wherein the monitoring module obtains, for each of the logical CPUs, a cache read count and a cache hit count that are counted while said each of the logical CPUs is run, and comprises cache information for holding the cache read count and the cache hit count that are counted while one logical CPU is run continuously, and wherein the scheduling module uses the monitoring module to update the cache information each time said each of the logical CPUs is run.

13. The non-transitory data storage medium according to claim 12, wherein the monitoring module obtains, from the cache information, the cache read count and the cache hit count that are counted while said each of the logical CPUs is run, to calculate the cache hit ratio.

14. The non-transitory data storage medium according to claim 11, wherein, when selecting from said another of the plurality of nodes different from the one of the plurality of nodes to which the physical CPU that has run the logical CPU the last time belongs, the scheduling module selects a physical CPU that is in a sleep state from said another of the plurality of nodes, and wakes up the selected physical CPU so that the logical CPU is run by the woken physical CPU.

* * * * *